US009526228B2

(12) United States Patent
Fraser et al.

(10) Patent No.: US 9,526,228 B2
(45) Date of Patent: Dec. 27, 2016

(54) PREDATION DETECTION FISH TRACKING TAG

(71) Applicant: Amirix Systems Inc., Bedford (CA)

(72) Inventors: Terrance William Fraser, Halifax (CA); Gary Donald Marsh, Boutiliers Point (CA); Chad Douglas Murphy, Porters Lake (CA); Douglas Bruce Oakley, Dartmouth (CA); Timothy Bruce Stone, Enfield (CA); Dale Mitchell Webber, Lake Fletcher (CA); Ryan Isaac Fielden, Dartmouth (CA); Kimberly Jean Miller, Halifax (CA); Mary Anne White, Halifax (CA)

(73) Assignee: Amirix Systems Inc., Bedford, Nova Scotia (CA)

( * ) Notice: Subject to any disclaimer, the term of this patent is extended or adjusted under 35 U.S.C. 154(b) by 148 days.

(21) Appl. No.: 14/200,782

(22) Filed: Mar. 7, 2014

(65) Prior Publication Data

US 2015/0250140 A1 Sep. 10, 2015

(51) Int. Cl.
*A01K 11/00* (2006.01)
*A01K 29/00* (2006.01)

(52) U.S. Cl.
CPC ........... *A01K 11/006* (2013.01); *A01K 29/005* (2013.01)

(58) Field of Classification Search
CPC .. A01K 11/006; A01K 61/001; A01K 29/005; G06K 19/0717–19/0723; G06K 2017/0045
See application file for complete search history.

(56) References Cited

U.S. PATENT DOCUMENTS

| 3,069,657 A | 6/1958 | Green, Jr. et al. |
| 3,216,411 A | 11/1965 | Watanuki et al. |
| 3,742,535 A | 7/1973 | Horrer et al. |
| 3,848,226 A | 11/1974 | Perez |
| 4,065,753 A * | 12/1977 | Paul, Jr. ............... A01K 11/006 102/501 |
| 4,430,552 A | 2/1984 | Peterson |
| 4,461,241 A | 7/1984 | Ostler |
| 4,854,328 A | 8/1989 | Pollack |

(Continued)

FOREIGN PATENT DOCUMENTS

| CA | 2691783 A1 | 4/2010 |
| CA | 2814808 A1 | 7/2014 |

(Continued)

OTHER PUBLICATIONS

Quick Course in Underwater Telemetry Systems (Jan. 2002); D.G. Pincock and F.A. Voegeli; © VEMCO Limited, 1990,1992,2001, 2002.

(Continued)

*Primary Examiner* — Hai Phan
*Assistant Examiner* — Orlando Bousono
(74) *Attorney, Agent, or Firm* — Harris Beach PLLC; Neal L. Slifkin

(57) ABSTRACT

A tracking tag for aquatic animals may detect the occurrence of a predation event. The tag may include a pH sensitive material that degrades in the environment of an animal's gut. The degradation of the pH sensitive material causes a change in a detectable characteristic of the tag, which allows the tag to detect the predation event and adjust its operation accordingly.

48 Claims, 24 Drawing Sheets

(56) References Cited

U.S. PATENT DOCUMENTS

| | | | | |
|---|---|---|---|---|
| 4,992,776 | A * | 2/1991 | Crossfield | G08B 13/2442 310/118 |
| 5,022,013 | A | 6/1991 | Dalton et al. | |
| 5,348,501 | A | 9/1994 | Brown | |
| 5,483,767 | A | 1/1996 | Langer | |
| 5,581,930 | A | 12/1996 | Langer | |
| 5,634,432 | A | 6/1997 | O'Grady et al. | |
| 5,701,276 | A | 12/1997 | Bellini | |
| 6,271,767 | B1 | 8/2001 | Frye et al. | |
| 6,286,460 | B1 * | 9/2001 | Gudbjornsson | A01K 61/001 119/200 |
| 6,304,182 | B1 * | 10/2001 | Mori | G08B 13/2414 340/545.6 |
| 6,519,206 | B1 * | 2/2003 | Martin | A01K 15/02 367/139 |
| 6,960,984 | B1 * | 11/2005 | Vicci | G06K 7/0008 340/10.1 |
| 7,187,623 | B2 | 3/2007 | Green et al. | |
| 7,487,614 | B1 | 2/2009 | Walker et al. | |
| 2002/0010390 | A1 | 1/2002 | Guice et al. | |
| 2004/0000998 | A1 * | 1/2004 | Karp | G08B 13/2402 340/572.3 |
| 2007/0078113 | A1 * | 4/2007 | Roth | A01N 1/02 514/114 |
| 2007/0123772 | A1 * | 5/2007 | Euliano | A61B 5/06 600/407 |
| 2008/0112885 | A1 | 5/2008 | Okunev et al. | |
| 2008/0146871 | A1 | 6/2008 | Arneson et al. | |
| 2008/0171725 | A1 * | 7/2008 | Roth | A01N 1/02 514/114 |
| 2008/0171726 | A1 * | 7/2008 | Roth | A01N 1/02 514/144 |
| 2008/0180242 | A1 * | 7/2008 | Cottingham | G06K 19/0723 340/539.12 |
| 2009/0261975 | A1 * | 10/2009 | Ferguson | G06K 19/0717 340/572.1 |
| 2010/0039690 | A1 * | 2/2010 | Agrawal | G02F 1/15 359/265 |
| 2011/0096388 | A1 * | 4/2011 | Agrawal | G02F 1/1506 359/268 |
| 2012/0040024 | A1 * | 2/2012 | Roth | A01N 1/02 424/702 |
| 2012/0092132 | A1 * | 4/2012 | Holme | A01K 11/008 340/10.1 |
| 2012/0134239 | A1 | 5/2012 | Struthers | |
| 2013/0021877 | A1 * | 1/2013 | Gotz | A01M 29/16 367/139 |
| 2013/0127523 | A1 | 5/2013 | Vereb et al. | |
| 2013/0143041 | A1 | 6/2013 | Mathias et al. | |
| 2014/0062667 | A1 * | 3/2014 | Ferguson | G06K 19/0717 340/10.1 |
| 2014/0178365 | A1 * | 6/2014 | Ghaderi | C07K 16/3076 424/133.1 |
| 2014/0211594 | A1 | 7/2014 | Allen et al. | |
| 2015/0063072 | A1 * | 3/2015 | Deng | A01K 11/006 367/134 |

FOREIGN PATENT DOCUMENTS

| | | |
|---|---|---|
| CN | 101559202 A | 10/2009 |
| WO | 9845169 | 10/1998 |

OTHER PUBLICATIONS

V5 and V6 Coded Transmitters (180Hz), V5 and V6 Coded Transmitters Datasheet (4977-01), pp. 1-2. © 2012 AMIRIX Systems Inc.

V9AP Coded Transmitter, V9AP Coded Transmitter Datasheet (4706-06) pp. 1-3, © 2012 AMIRIX Systems Inc.

V13 Coded Transmitter, V13 Coded Transmitter Datasheet (4458-07) pp. 1-2, © 2011 AMIRIX Systems Inc.

VEMCO Acoustic Telemetry New User Guide, Dr. Dale Webber, VEMCO DOC-004934-01, © (2009) AMIRX Systems Inc.

VR2W Single Channel Receiver, R2W Single Channel Receiver Datasheet (4395-04) pp. 1-2, © 2012 AMIRIX Systems Inc.

Introducing the VEMCO VR2W Positioning System (VPS), Introducing the VEMCO VR2W Positioning System (VPS) Datasheet (4722-02), pp. 1-2, © 2008 AMIRIX Systems Inc.

"Applications of Chitosan and Chitosan Derivatives in Drug Delivery," Vipin Bansal et al, Advances in Biological Research 5 (1): 28-27, 2011. ISSN 1992-0067 © IDOSI Publications, 2011.

Chitin and Chitosan: Properties and Applications, Marguerite Rinaudo, Science Direct, Prog. Polym. Sci. 31 (2006) 603-632. www.sciencedirect.com.

"Influence of the Chemical Structure and Physicochemical Properties of Chitin- and Chitosan-Based Materials on Their Biomedical Activity," Jolanta Kumirska et al., Chapter 2 of: Biomedical Engineering, Trends in Materials Science, Ed. Anthony N. Laskovski, Pub. Intech (Online) Jan. 8, 2011. ISBN 978-953-307-513-6.

Robert D. Moore et al. An Ocean Bottom, Microprocessor Based Seismometer; Geological Research Division, Scripps Institute of Oceanography, University of California-San Diego, California, pp. 1-27.

Notification of Transmittal of the International Search Report and Written Opinion of the International Searching Authority, PCT/CA2015/050160, Jun. 9, 2015, pp. 1-14.

Antimicrobial and Physical Properties of Chitosan Film as Affected by Solvent Types and Glycerol as Plasticizer, Syarifah Nur Adila et al, Trans Tech Publications (ID: 216. 33.62.90, Infotrieve, Inc.-Apr. 27, 2015, 16:22:14).

Influence of Gelatin/Chitosan Wound Dressing on Shrinkage of Newly Incised Wounds, Huang Zhi-lin et al, Chinese Journal of Clinical Rehabilitation, Aug. 14, 2005, vol. 9, No. 30.

Preparation of Chitosan-Based Adhesives and Assessment of Their Mechanical Properties, Anil K. Patel et al., Journal of Applied Polymer Science, Published May 23, 2012.

Probability of Detecting Marine Predator-Prey and Species Interactions Using Novel Hybrid Acoustic Transmitter—Receiver Tags, Laurie L. Baker et al., PLOS ONE, Jun. 2014, vol. 9, Issue 6, e98117.

Cui, Zheng et at., Green Chemistry Letters and Reviews, 4/1: 35-40 Mar. 2011 Modification of chitosan films with environmentally benign environmentally benign reagents for increased water resistance.

Solid-State and Mechanical Properties of Aqueous Chitosan-Amylose Starch Films Plasticized With Polyols, Mirna Fernandez Cervera et al., AAPS PharmaSciTech 2004; 5(1) Article 15 (http://www.aapspharmscitech.org).

Ultrasonic Telemetry: Its Application to Coral Reef Fisheries Research, Dirk C. Zeller, Fish. Bull. 97 (4): 1058-1065 (1999).

Ultrasonic Telemetry, Tracking and Automated Monitoring Technology for Sharks, Frederick A. Voegeli, Environmental Biology of Fishes 60:267-281, 2001.

Cooke et al. Tracking animals in freshwater with electronic tags: past, present and future. Animal Biotelemetry, vol. 1, No. 2, May 1, 2013, [online], [retrieved on Dec. 30, 2015]. Retrieved from the Internet: URL: http://animalbiotelemetry.biomedcentral.com/articles/10.1186/2050-3385-1-5.

Nielson et al. Tagging and Tracking of Marine Animals with Electronic Devices. London: Springer, 2009, ISBN 978-1-4020-9639-6, p. 17.

PCT: International Search Report, Date of Mailing: Feb. 2, 2016 (Feb. 2, 2016), 6 pages.

* cited by examiner (A)

(B) (C)

(A)

(B) (C)

PREDATION DETECTION FISH TRACKING TAG

FIELD OF THE INVENTION

The current description relates to a tracking tag for aquatic animals, and in particular to a tracking tag capable of detecting a predation event.

BACKGROUND

Fish or other marine animals may be tagged with tracking devices in order to track their movement. The tracking tags transmit ultrasonic pulses that can be detected at one or more receivers deployed at various locations in a body of water under study.

The tags used for tracking marine animals are often implanted within the coelomic cavity of the animal being tracked. Typically, tracking tags periodically transmit ultrasonic pulses to communicate a unique identifier of the tag that allows individual animals to be tracked. Additionally, the tracking tags may also communicate other data collected by the tag, such as temperature and acceleration information. Once the tracking tags are activated, they typically will continue to transmit until a battery dies.

When a tagged marine animal is eaten by a predator, the tracking tag often will continue to operate within the predator's body. Researchers have been unable to determine if the tracking tag was operating in a tagged animal or within a predator.

An additional, alternative and/or improved tracking tag for marine animals is desirable.

SUMMARY

In accordance with the present disclosure there is provided a tag for tracking an aquatic animal comprising: a sensor for detecting a characteristic of the tag; a pH sensitive material exposed to an external environment of the tag, the pH sensitive material degrading in the presence of an acidic environment, the degradation of the pH sensitive material causing a detectable change in a characteristic of the tag detected by the sensor; and a transducer for transmitting an ultrasonic signal based on at least the detection of the characteristic of the tag by the sensor.

In a further embodiment, the acidic environment is a gut of a predator fish.

In a further embodiment, the pH sensitive material does not degrade substantially in a neutral or basic environment.

In a further embodiment, the neutral or basic environment is a coelomic cavity.

In a further embodiment, the sensor for detecting the characteristic of the tag comprises a magnetic field sensor capable of sensing a presence or absence of a magnet, wherein the magnet is fastened to the tag by the pH sensitive material such that the magnet is released from the tag when the pH sensitive material degrades in the acidic environment.

In a further embodiment, the sensor for detecting the characteristic of the tag comprises electrodes covered in the pH sensitive material, wherein an impedance of the electrodes changes when the pH sensitive material degrades in the acidic environment.

In a further embodiment, the sensor for detecting the characteristic of the tag comprises a resilient electrode separated from a second electrode by the pH sensitive material, wherein the resilient electrode is biased in order to contact the second electrode when the pH sensitive material degrades in the acidic environment.

In a further embodiment, the sensor for detecting the characteristic of the tag comprises a resilient strain gauge cast within the pH sensitive material such that when the pH sensitive material degrades in the acidic environment the resilient strain gauge changes configurations.

In a further embodiment, the sensor for detecting the characteristic of the tag comprises a light transmitting device and a light receiving device aligned with the light transmitting device and separated by the pH sensitive material to block transmission of light from the light transmitting device to the light receiving device.

In a further embodiment, the pH sensitive material comprises a chitosan.

In a further embodiment, the pH sensitive material is cast from a slurry of the chitosan and a solvent.

In a further embodiment, the solvent is selected from: L-ascorbic acid; citric acid; acetic acid; and hydrochloric acid.

In a further embodiment, the solvent is citric acid.

In a further embodiment, the solvent is acetic acid.

In a further embodiment, the pH sensitive material comprises a film having a thickness of at least 0.05 mm.

In a further embodiment, the pH sensitive material comprises a film having a thickness of at least 0.20 mm.

In a further embodiment, the pH sensitive material comprises a plasticizing agent.

In a further embodiment, the plasticizing agent is selected from: glycerol; ethylene glycol; poly ethylene glycol; erythritol; oleic acid; propylene glycol; di-hydroxyl stearic acid; and sorbitol.

In a further embodiment, the plasticizing agent is glycerol.

In a further embodiment, the pH sensitive material was treated with a cross-linking agent.

In a further embodiment, the cross-linking agent is selected from: sodium citrate; sodium sulfate; and calcium chloride.

In a further embodiment, the tag further comprises a microprocessor coupled to the transducer and the sensor, the microprocessor controlling the transmission of the ultrasonic signal by the transducer.

In a further embodiment, the microprocessor operates in at least one of a first mode or a second mode based on at least the detection of the characteristic of the tag by the sensor.

In a further embodiment, the microprocessor switches from operating in the first mode to operating in the second mode when the detection of the characteristic of the tag by the sensor changes as a result of a degradation of the pH sensitive material in the presence of the acidic environment.

In a further embodiment, the microprocessor operates in at least a configuration mode for transferring data to the tag to configure operation of the microprocessor.

In a further embodiment, a varying magnetic field is used for transferring data to the tag when the microprocessor is in the configuration mode.

In a further embodiment, the microprocessor further operates in at least a calibration mode for determining a value for a compensation magnetic field to allow detecting of the varying magnetic field used for transferring data in the presence of a constant magnetic field.

In a further embodiment, the microprocessor calculates the value for the compensation magnetic field and transmits the calculated value for the compensation magnetic field to an activation device.

In a further embodiment, the tag transmits an indication of detected magnetic field in order to allow an activation device to calculate the value for the compensation magnetic field.

In accordance with the present disclosure there is provided an activator for activating a predation tag that detects a predation event using a magnetic field sensor to detect a magnet, the activator comprising: a coil driver for generating a magnetic field in the vicinity of the predation tag being activated; a transducer for detecting a signal from the predation tag; and a microcontroller controlling the coil driver, the microcontroller configured to vary the magnetic field generated by the coil driver and determine a strength of a compensation magnetic field required to counteract the magnetic field generated by the magnet detected at the magnetic sensor of the predation tag based on the signal detected by the transducer.

In a further embodiment, the signal detected by the transducer comprises an indication of the compensation field calculated by the predation tag based on the varying magnetic field generated by the coil driver.

In a further embodiment, the microprocessor controls the coil driver to generate an asymmetrical triangular waveform at a particular frequency.

In a further embodiment, the particular frequency is between 10 Hz and 1 kHz.

In a further embodiment, the particular frequency is 100 Hz.

In a further embodiment, the signal detected by the transducer comprises an indication of the presence or absence of a magnetic field at the magnetic field sensor of the predation tag.

In a further embodiment, the activator calculates the compensation magnetic field based on a strength of the varying magnetic field when the signal detected by the transducer indicates the absence of the magnetic field at the magnetic field sensor of the predation tag.

In a further embodiment, the activator, further varies the magnetic field between the compensation magnetic field so that the absence of the magnetic field is detected at the magnetic field sensor and a second magnetic field value so that the presence of the magnetic field is detected at the magnetic field sensor, thereby allowing communication between the activator and the tag.

In accordance with the present disclosure there is provided a method of activating a predation tag that detects a predation event using a magnetic field sensor to detect a magnet, the method comprising: varying a strength of a magnetic field generated by an activator; determining a strength of a compensation magnetic field required to counteract the magnetic field generated by the magnet detected at the magnetic sensor of the predation tag; and varying the strength of the magnetic field generated by the activator based on the strength of the compensation magnetic field to communicate with the predation tag.

In a further embodiment, the method further comprises generating, at the activator, a wakeup signal indicating that the tag should enter a calibration mode; receiving, at the activator, a signal from the tag that the calibration mode has been entered;

In a further embodiment, varying the strength of the magnetic field generated by the activator comprises: setting a value of a first digital to analog converter (DAC) to generate a magnetic field at the determined strength of the compensation magnetic field; setting a value of a second digital to analog converter (DAC) to generate the magnetic at a strength different from the strength of the compensation magnetic field; switching a coil driver between the first DAC and the second DAC to vary the magnetic field.

In a further embodiment, determining the strength of the compensation magnetic field comprises: varying the strength of the magnetic field generated by the activator; receiving at the activator a signal from the tag indicative of the magnetic field detected by the magnetic field sensor of the tag; and determining at the activator the strength of the magnetic field generated by the activator that resulted in no magnetic field being detected by the magnetic field sensor of the tag.

In a further embodiment, determining the strength of the compensation magnetic field comprises: varying the strength of the magnetic field generated by the activator in a asymmetric wave pattern; detecting the magnetic field by the magnetic field sensor of the tag; determining at the tag the strength of the magnetic field generated by the activator resulting in no magnetic field being detected by the magnetic field sensor of the tag based on the asymmetry of the wave pattern; and receiving at the activator a signal from the tag indicative of the strength of the magnetic field generated by the activator that resulted in no magnetic field being detected by the magnetic field sensor of the tag.

In accordance with the present disclosure there is provided a pH sensitive adhesive material cast from a slurry comprising: a chitosan; a solvent; and a plasticizing agent.

In a further embodiment, the solvent is selected from: L-ascorbic acid; citric acid; acetic acid; and hydrochloric acid.

In a further embodiment, the solvent is citric acid.

In a further embodiment, the solvent is acetic acid.

In a further embodiment, the pH sensitive material is cast in a film having a thickness of at least 0.05 mm.

In a further embodiment, the pH sensitive material is cast in a film having a thickness of at least 0.20 mm.

In a further embodiment, the plasticizing agent is selected from: glycerol; ethylene glycol; poly ethylene glycol; erythritol; oleic acid; propylene glycol; di-hydroxyl stearic acid; and sorbitol.

In a further embodiment, the plasticizing agent is glycerol.

In a further embodiment, the pH sensitive material is treated with a cross-linking agent.

In a further embodiment, the cross-linking agent is selected from: sodium citrate; sodium sulfate; and calcium chloride.

BRIEF DESCRIPTION OF THE DRAWINGS

Features, aspects and advantages of the present disclosure will become better understood with regard to the following description and accompanying drawings in which.

DETAILED DESCRIPTION

A tracking tag for tracking marine animals is described further herein. The tracking tag is capable of detecting if the fish being tracked has been eaten by a predator and adjusting its operation upon detection of the predation event. The tracking tag uses a pH sensitive material that degrades in the presence of the acidic environment of a predator's gut in order to change a detectable characteristic of the tag. When the pH sensitive material degrades in the predator's gut, a measurable characteristic changes and the change in the characteristic is detected. Upon detection of the change, the operation of the tracking tag can be adjusted in order to signal the occurrence of the predation event.

Figure 1:
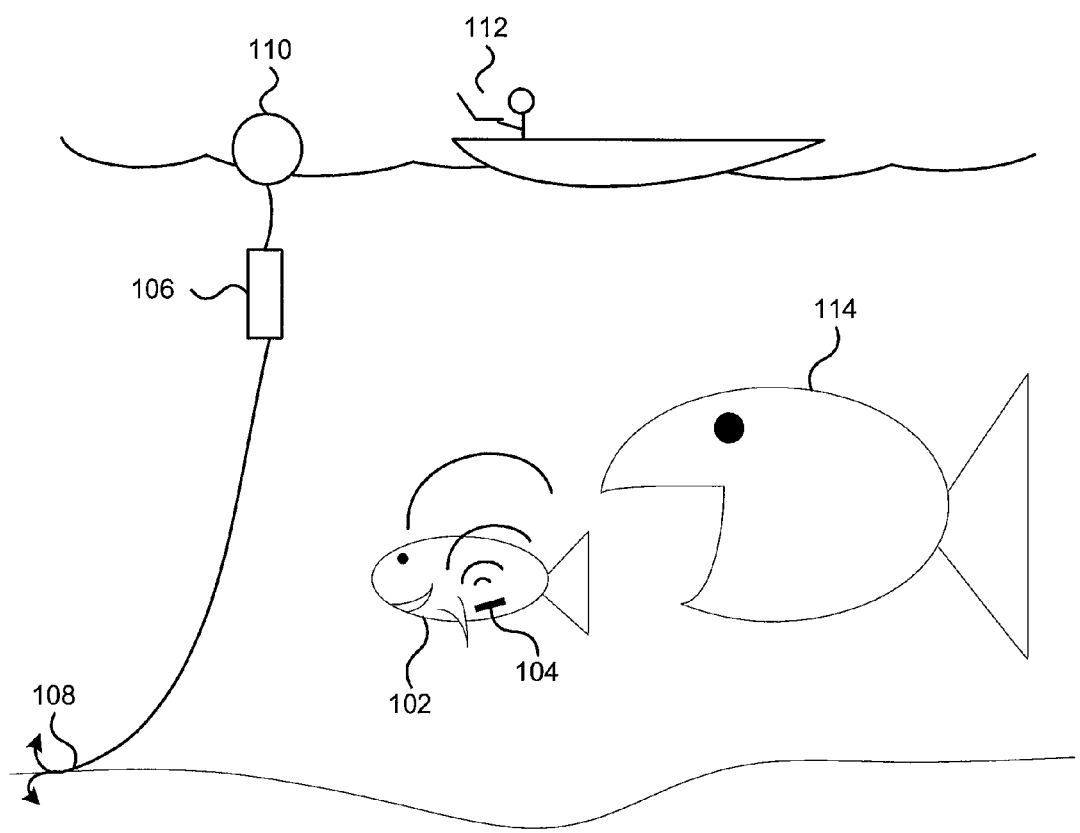
FIG. 1 depicts an environment in which tracking tags may be used.

FIG. 1 depicts an environment 100 in which tracking tags may be used. A fish 102 is tagged with a tracking device 104, referred to as a tracking tag, or simply a tag. Tracking tags may be implanted within the coelomic cavity of the animal. Additionally or alternatively, the tracking tag may be externally attached to the animal, for example by adhering or affixing to an animal's coat or fin. The tag 104 periodically emits ultrasonic pulses that are received by one or more receivers 106 that are located within the body of water or area being studied. The receivers may be anchored 108 in place or may be suspended by a buoy 110, or any other suitable means of positioning the receiver at a desired location. The receiver 106 detects the ultrasonic pulses transmitted by tags. The detection events are recorded and stored by the receiver 106. The recorded events can be retrieved from each of the receivers. For example, the data can be periodically downloaded to a computer such as a laptop 112. Although depicted as being carried out while the receiver 106 remains in position, the data may also be retrieved from the receiver 106 by a physical connection to the receiver, which may require the receiver 106 to be retrieved. The length of time the receiver remains in place may vary depending upon the requirements of the study. Further, it is possible to track a tag in real time; however, this is typically performed by having a receiver located on a boat and following the marine animal being tracked as it moves about.

The tags may communicate data using various techniques. For example, the tags may continuously transmit signals, or may periodically transmit signals. The time interval at which the tags transmit signals may vary and may be adjustable. For example, a tag may transmit signals every 1 second, 5 seconds, 10 seconds, 15 seconds, 30 seconds 60 seconds, or at other intervals. In addition to varying when tags transmit information, the information that is transmitted may also be varied. For example, the tag may simply transmit a unique, or unique within a particular set of tags, identifier (ID). Receivers may detect the periodic transmission of the unique IDs and record the detection events, along with the time of the detection. The movement of the animal being tracked can be reconstructed from the various detection events with corresponding unique IDs. In addition to the unique ID, the tag may also transmit other information such as a sequence number that increases with each transmission, or other data that is tracked by the tag depending upon available sensors in the tag. For example, the tag may also indicate readings from a temperature sensor, acceleration sensors or other types of sensors as may be provided by the tag.

Tags may last for a varying period of time depending upon the operating characteristics of the tag as well as the power supply of the tag. Generally, a tag is activated prior to being attached to or implanted in the animal being tracked. Once the tag is activated it will typically continue to operate until it does not have sufficient power. If a marine animal being tracked, such as fish 102, is eaten by a predator such as fish 114, the tag may continue to operate and the movement of the predator may be incorrectly associated with the marine animal that was eaten.

Tags as described herein can detect a predation event and adjust their operation accordingly. When a tag detects that the marine animal has been eaten, the tag may stop transmitting further information, or may continue transmitting information but provide an indication that a predation event was detected, for example by transmitting a secondary ID of the tag. The secondary ID of the tag may include the original unique ID or be otherwise associated with the original ID so that the animal that was eaten can be determined. For example the first unique ID for tracking a tagged living animal may be 123A while the second unique ID of the tag used when a predation event has been detected may be 123B. In this example of the IDs it is assumed that the 123 portion of both IDs is unique with regard to other tags. The tag does not detect the predation event directly, but rather detects a change associated with the animal being eaten. The tag may use a pH sensitive material that degrades in the acidic environment of the gut of a predator. The degradation of the pH sensitive material can be detected by the tag and, as such, the tag can adjust its operation accordingly.

Figure 2:
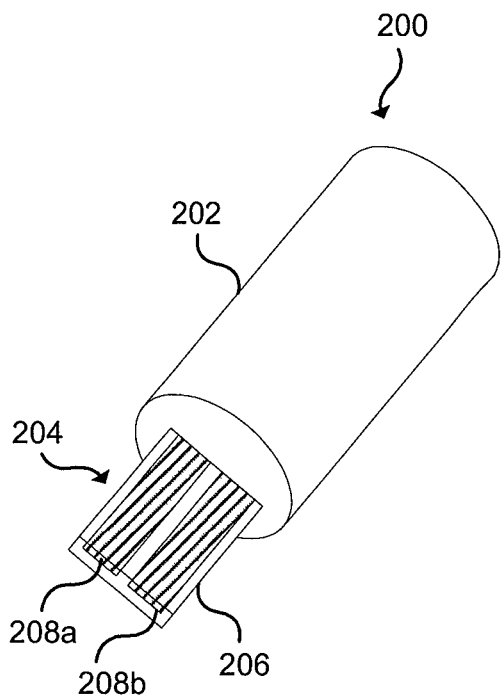
FIGS. 2A, 2B, 2C depict a predation tracking tag.
Figure 2:
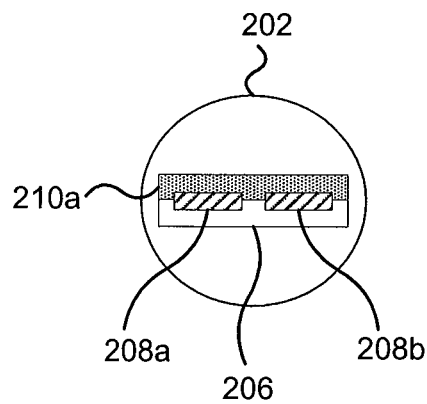
Figure 2:
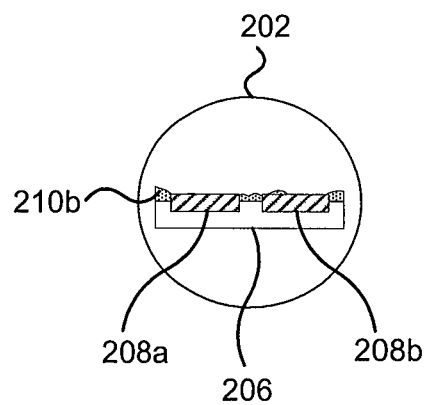

FIGS. 2A, 2B, 2C depict a predation tracking tag. The predation tracking tag 200 may be used to track a marine animal. The tag 200 detects a predation event, i.e., the tagged animal being eaten by a predator. The tag 200 comprises a main body 202 that houses the main tag components. The tag 200 may vary in size from a few millimeters to a few centimeters or more depending upon the size of the animal being tracked. The tag 200 includes a sensor 204 that detects an electrical characteristic of the tag 200. The sensor 200 comprises a substrate 206 that provides support for two electrodes 208a, or 208b. The impedance or other electrical characteristics of the electrodes can be detected by a microcontroller of the tag.

A coating or film of a pH sensitive material 210a may be formed over the electrodes 208a, 208b as depicted in FIG. 2B. The pH sensitive material is selected to degrade, preferably quickly, in the acidic environment of a predator's gut, while resisting degradation in a neutral or basic environment, such as a coelomic cavity of an animal in which the tag has been implanted. As such, when the tag remains in the coelomic cavity of the animal being tracked, the pH sensitive material stays intact covering the electrodes 208a, 208b and as such a first value will be measured for the particular electrical characteristic being monitored, such as impedance or resistance.

If the tagged animal is eaten, the animal will be digested within the gut of the predator, and as such the tag 200 will be exposed to the acidic environment of the predator's gut. The acidic environment will degrade the pH sensitive material 210b covering the electrodes as depicted in FIG. 2C. As the pH sensitive material is degraded, the electrodes 208a, 208b will be exposed to the environment and the previously measured value of the electrical characteristic will change. The different value is detected and used by the tag to determine that a predation event has occurred. Once the tag, or more particularly a microcontroller of the tag, has determined that the predation event has occurred, the operation can be adjusted accordingly, for example by stopping further transmission, or by altering the transmitted ID of the tag used to indicate that the tag has detected a predation event.

Various pH sensitive materials may be used, and a selection of possible pH sensitive materials are described further herein. The pH sensitive material should resist degradation when in the environment associated with a living animal being tracked. The pH sensitive material should resist degradation in such an environment for a relatively long period of time, such as the expected operating lifetime of the tag. Although the pH sensitive material should resist degradation within a normal operating environment, such as within a coelomic cavity, it should degrade, preferably quickly, within the acidic environment. For example, the pH sensitive material may degrade quickly enough to expose the electrodes within 60 to 120 minutes of a tagged animal being eaten by a predator. The composition of the pH sensitive material, as well as an amount of the pH sensitive material used to cover the electrodes, and so which must degrade to expose the electrodes, can be adjusted to meet the required characteristics. Further, the composition may include one or more additives that may affect the detection of the characteristic and, as such, facilitate the determination of whether or not the pH sensitive material is still intact or has substantially degraded. The pH sensitive material may be considered to have substantially degraded once it has degraded enough that a change in the characteristic can be detected in order to indicate the occurrence of the predation event.

Figure 3:
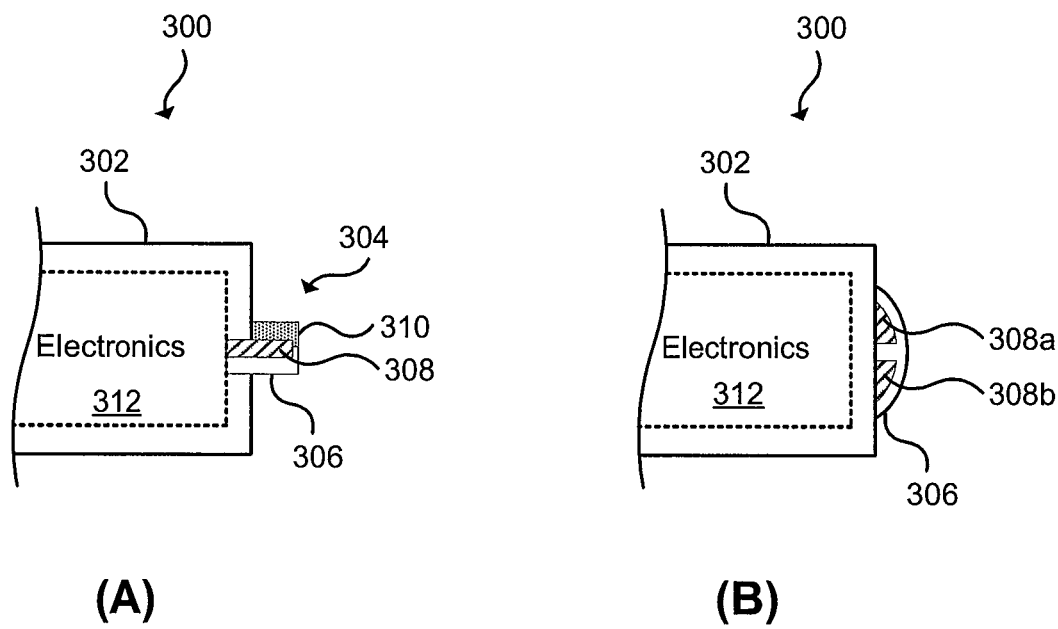
FIGS. 3A, 3B depict a further predation tracking tag.

FIGS. 3A, 3B depict further predation tracking tags. The tags depicted are similar to the tag 200 described above; however, the geometry of the electrodes differ. The predation tracking tag 300 comprises a body 302 and shortened and rounded predation sensor 304 coupled to the electronics 312 of the predation tracking tag 302. The predation sensor 304 comprises electrodes 308a, 308b on a substrate 306. The electrodes 308a, 308b are covered with a pH sensitive material 310 that degrades in the acidic environment of a predator's digestive tract. When an aquatic animal tagged with the predation tracking tag 302 is eaten by a predator, the pH sensitive material 310 dissolves in the digestive tract of the animal. Once the pH sensitive material 310 degrades, the electrodes 308a, 308b are exposed to the environment and the electronics 312 may detect a change in the electrical characteristics of the electrodes. The shortened and rounded geometry of the predation sensor 304 may appropriate for insertion into the coelomic cavity due to its shortened length and lack of corners.

Figure 4:
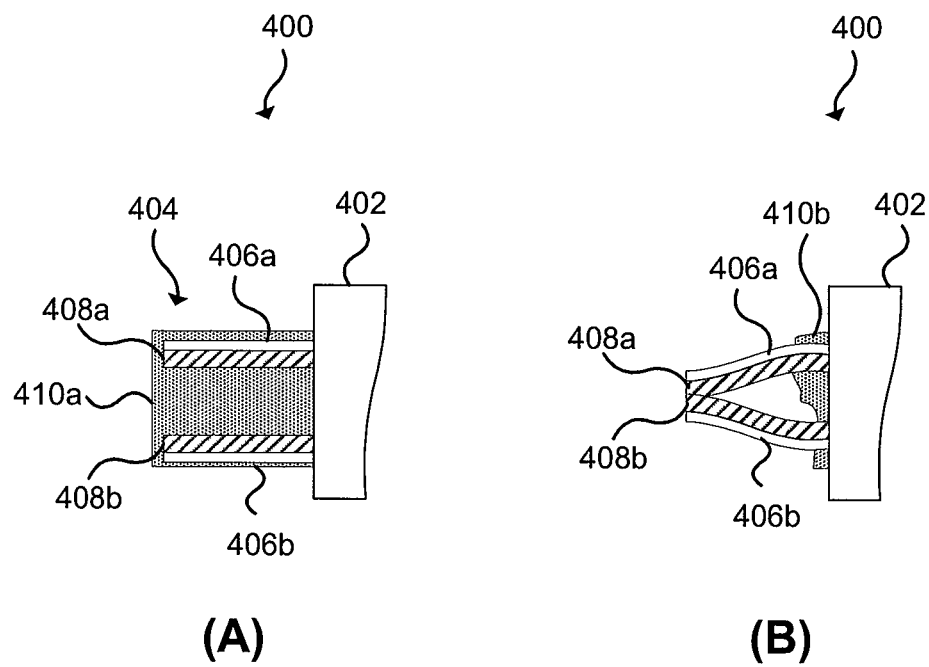
FIGS. 4A, 4B depict a further predation tracking tag.

FIGS. 4A, 4B depict a further predation tracking tag. The tag 400 is similar to the tags described above and comprises a body 402 and an external sensor component capable of measuring a characteristic of the tag. The sensor 404 comprises two resilient electrodes, each comprising a resilient material 406a, 406b and a conductive material 408a, 408b. As depicted in FIG. 4A, the pH sensitive material 410a is cast in order to prevent the resilient electrodes from contacting each other. When an acidic environment substantially degrades the pH sensitive material 410b as depicted in FIG. 4B, the resilient material 406a, 406b of the electrodes cause the electrically conductive material 408a, 408b to come into contact with each other. The tag 400, or more particularly a microcontroller of the tag, can detect the newly established electrical connection between the two electrodes, which may be used as an indication that the marine animal being tracked was eaten by a predator. Once the tag detects the electrical connection between the electrodes, the tag may switch from the first mode of operation associated with tracking the animal originally tagged to a second mode of operation associated with the originally tagged animal being eaten by a predator.

Figure 5:
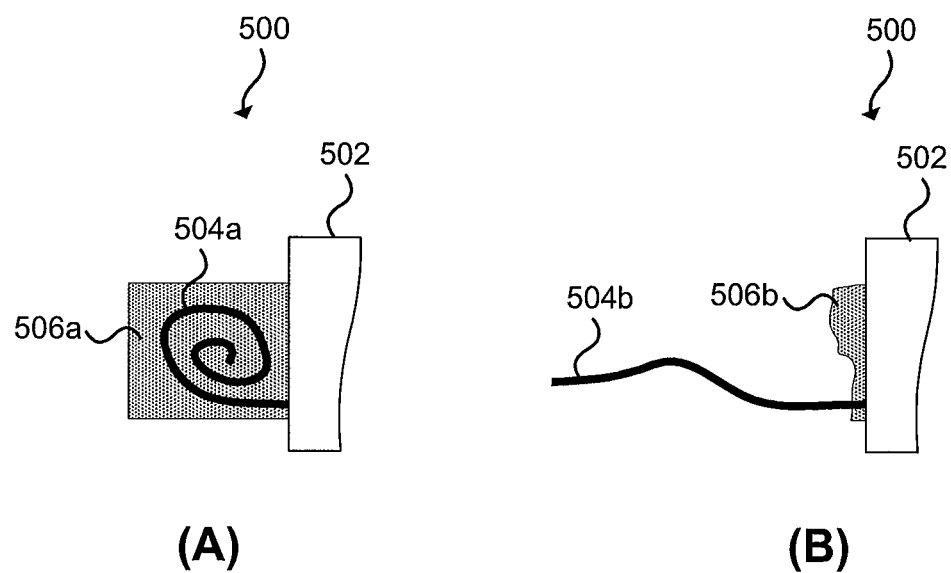
FIGS. 5A, 5B depict a further predation tracking tag.

FIGS. 5A, 5B depict a further predation tracking tag. The tag 500 is similar to the tags described above and can detect a change in a characteristic of the tag 500 when the environment the tag is in changes from a neutral or basic environment, such as that found in coelomic fluid, to an acidic environment such as that found in the gut of a predator. The tag 500 comprises a body 502 and a sensor for measuring a characteristic of the tag. The sensor is depicted as a strain gauge 504a or other similar sensor that changes its electrical characteristics based on the shape of the sensor 504a. As depicted in FIG. 5A, the strain gauge 504a may be cast within a pH sensitive material 506a in order to maintain the strain gauge 504a in a first configuration. As depicted in FIG. 5B, when the acidic environment substantially degrades the pH sensitive material 506b, the strain gauge 504b changes configurations, reducing the strain, which may be detected by the tag and used as an indication that the animal being tracked was eaten by a predator.

Figure 6:
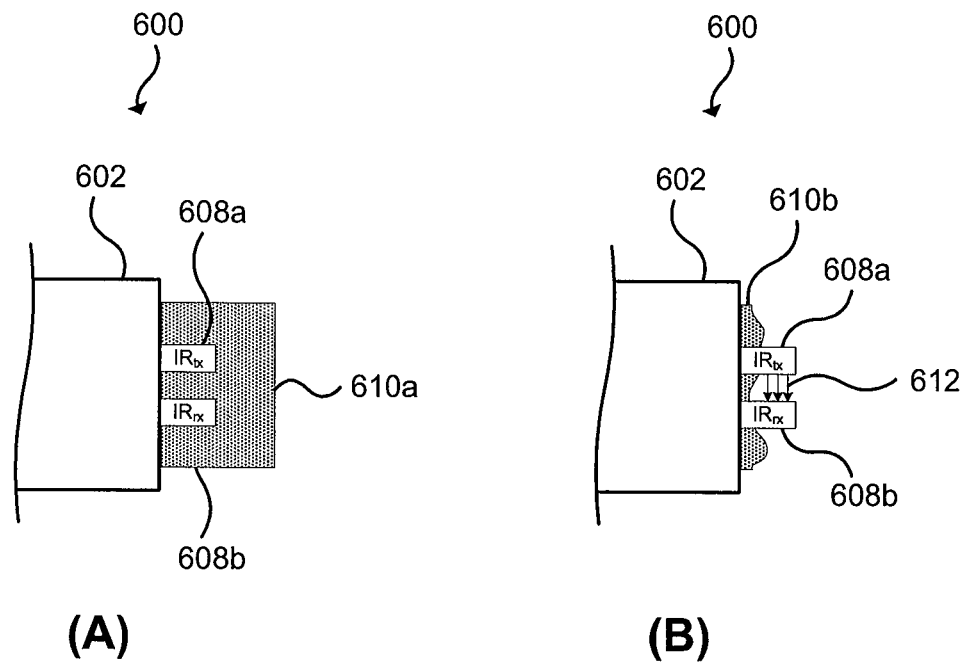
FIG. 6A, 6B depict a further predation tracking tag.

FIG. 6A, 6B depict a further predation tracking tag. The tag 600 is similar to the tags described above and can detect a change in a characteristic of the tag 600 when the environment the tag is in changes from a neutral or basic environment, such as that found in coelomic fluid, to an acidic environment such as that found in the gut of a predator. The tag 600 comprises a body 602 and a sensor for measuring a characteristic of the tag. The sensor is depicted as an infrared (IR) transmitter and receiver pair 608a, 608b. The IR transmitter 608a and IR receiver 608b are encased in pH sensitive material 610a that degrades in an acidic environment. The pH sensitive material 610a is opaque so that when present, as depicted in FIG. 6A, infrared light transmitted from the IR transmitter 608a is not received at the receiver 608b. When the pH sensitive material 608b is degraded as depicted in FIG. 6B, infrared light transmitted from the IR transmitter 608a is received at the IR receiver 608b as depicted by arrows 612. The detection of the infrared light at the receiver 608b may be detected by the electronics of the tag and used as an indication that a predation event has occurred.

Figure 7:
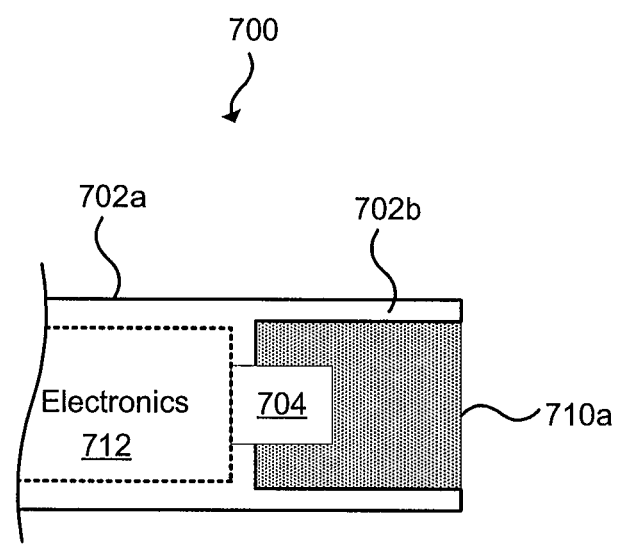
FIG. 7 depicts a further predation tracking tag.

FIG. 7 depicts a further predation tracking tag. The tag 700 may be similar to the tags described above, however the body of the tag is extended to provide physical protection to the predation sensors. The predation tags described above may include a predation sensor that extends past the body of the tag. Due to the small size of the tags, the extending predation sensors may be susceptible to breaking. The predation tag 700 comprises a body that provides protection to the predation sensor 704. The body comprises a main body portion 702a that encases the electronics 712 of the tag. The main body portion 702a may be provided by a tube or other similar structure. The body further comprises a hollow extending portion 702b that extends past the predation sensor 704 and provides physical protection to the predation sensor against damage. The hollow cavity of the extending body portion 702b may be filled or partially filled with pH sensitive material 710a. The extending portion 702b of the tag body is open at one end in order to expose the pH sensitive material to the environment of the tag so that the pH sensitive material will degrade when a predation event occurs.

Figure 8:
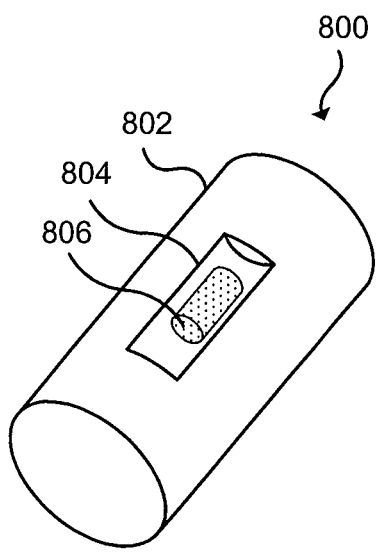
FIGS. 8A, 8B, 8C depict a further predation tracking tag.
Figure 8:
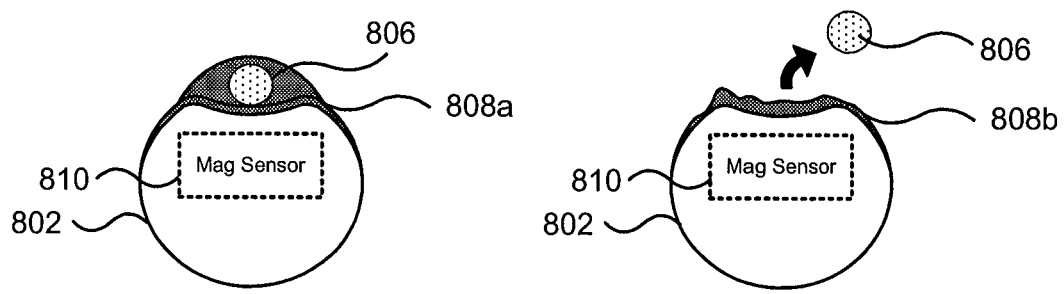

FIGS. 8A, 8B, 8C depict a further predation tracking tag. The tag 800 is similar to the tag 200; however, rather than using electrodes to detect a change in an electrical characteristic, the tag 800 uses a magnetic sensor 810 to detect the presence or absence of a magnet 806.

As depicted in FIG. 8A, the tag 800 includes a body 802 that has a recessed portion 804 for receiving a magnet 806. Although depicted as being situated within a recess 804, it is contemplated that the magnet may be affixed to the tag without being situated within a recess. The magnet 806 is affixed to the tag 800 by a pH sensitive material 808a as depicted in FIG. 8B. The magnet 806 may be affixed by a layer of pH sensitive material that acts as an adhesive to hold the magnet 806 in place while a further coating of pH sensitive material is used to further adhere the magnet 806 to the tag 802. As previously described, the pH sensitive material degrades in the acidic environment of a predator's gut. Once the acidic environment degrades the pH sensitive material 808b that affixes the magnet 806, the magnet 806 may separate from the tag 800 and the absence of the magnet may be detected by the tag 800. Once the absence of the magnet 806 is detected by the tag 800, the tag may switch modes of operation to indicate that a predation event has been detected.

Various tags have been described above that can be used to track a marine animal and also provide an indication that the animal has been eaten by a predator. The tags are battery operated and are generally activated prior to being tagged to an animal. Tags may include a magnetic sensor in order to provide a means of activating the tags. The tags may be inserted into a magnetic field produced by an activation device. The magnetic sensor of the tag detects the magnetic field, which may provide instructions for activating the tag.

Figure 9:
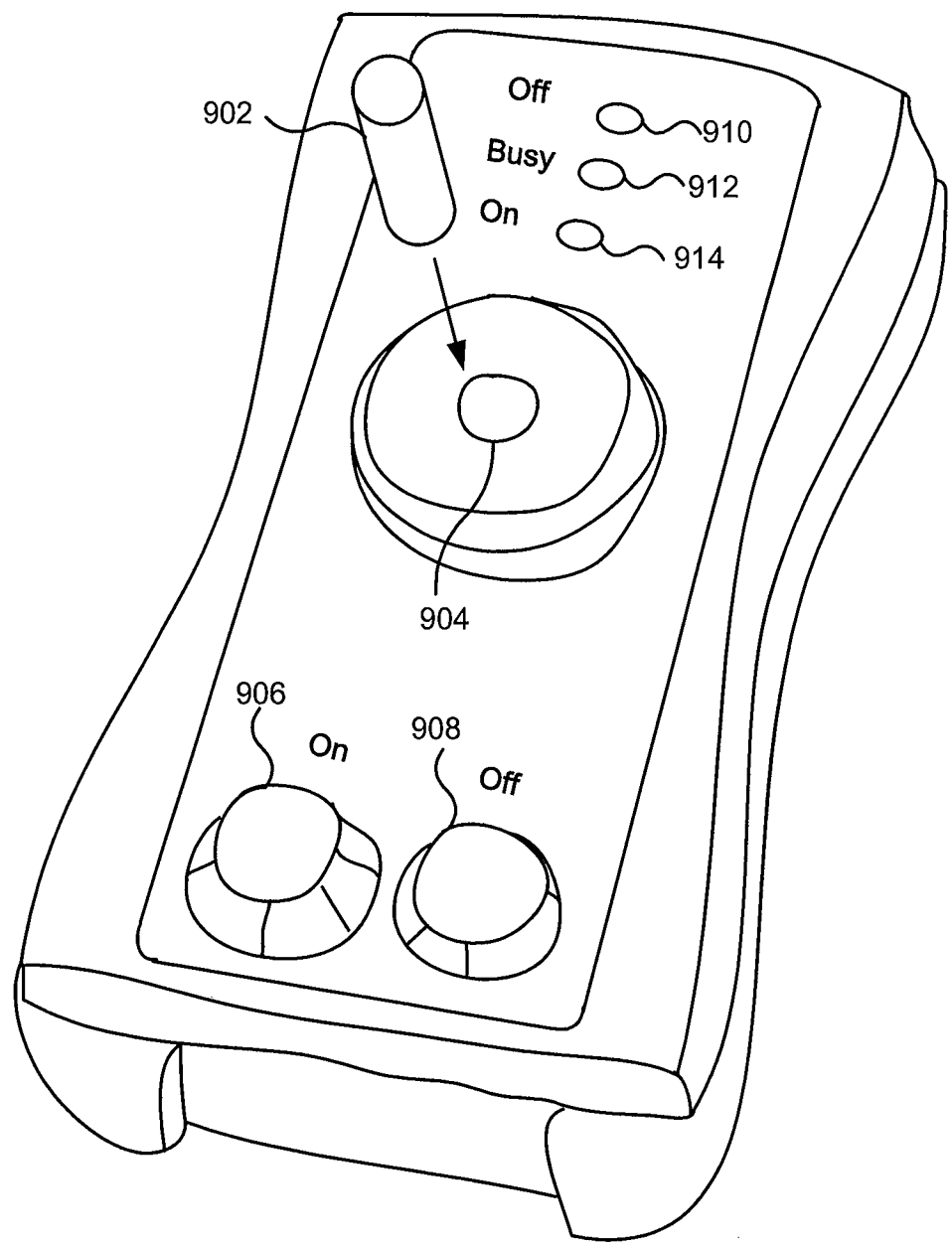
FIG. 9 depicts an activator for activating a predation tracking tag.

FIG. 9 depicts an activator for activating a tracking tag. The activator 900 may be handheld device into which a tag 902 to be activated is inserted. The activator 900 has a chamber 904 into which the tag can be placed. An electromagnetic coil may be wound around the chamber 904 so that when the tag is placed within the chamber 904, it is within a magnetic field of the coil. The magnetic field produced by the coil can be controlled by the activator 900 and may communicate activation commands to tags. It may be possible to communicate other information from the activator to the tag by controlling the magnetic field produced by the coil. For example, an operation mode of the tag may be set, or transmission frequency or other options may be controlled. The activator may also de-activate tags in a similar manner. The activator 900 includes input and output components for controlling the operation of the activator. For example, the activator may have an 'On' button 906 that is used for activating the tag. An 'Off' button 908 may be used to deactivate an activated tag. The activator 900 may include outputs or display means for providing information about the tag. For example, the activator may include an 'Off' LED 910 that may be used to indicate that the tag is deactivated. A 'Busy' LED 912 may indicate that the activator is currently busy, for example it may be attempting to activate or deactivate a tag. An 'On' LED 914 may indicate that the tag has been successfully activated. In order to determine if the tag has been successfully activated or deactivated, the activator 900 may listen for the ultrasonic transmission of the tag.

Figure 10:
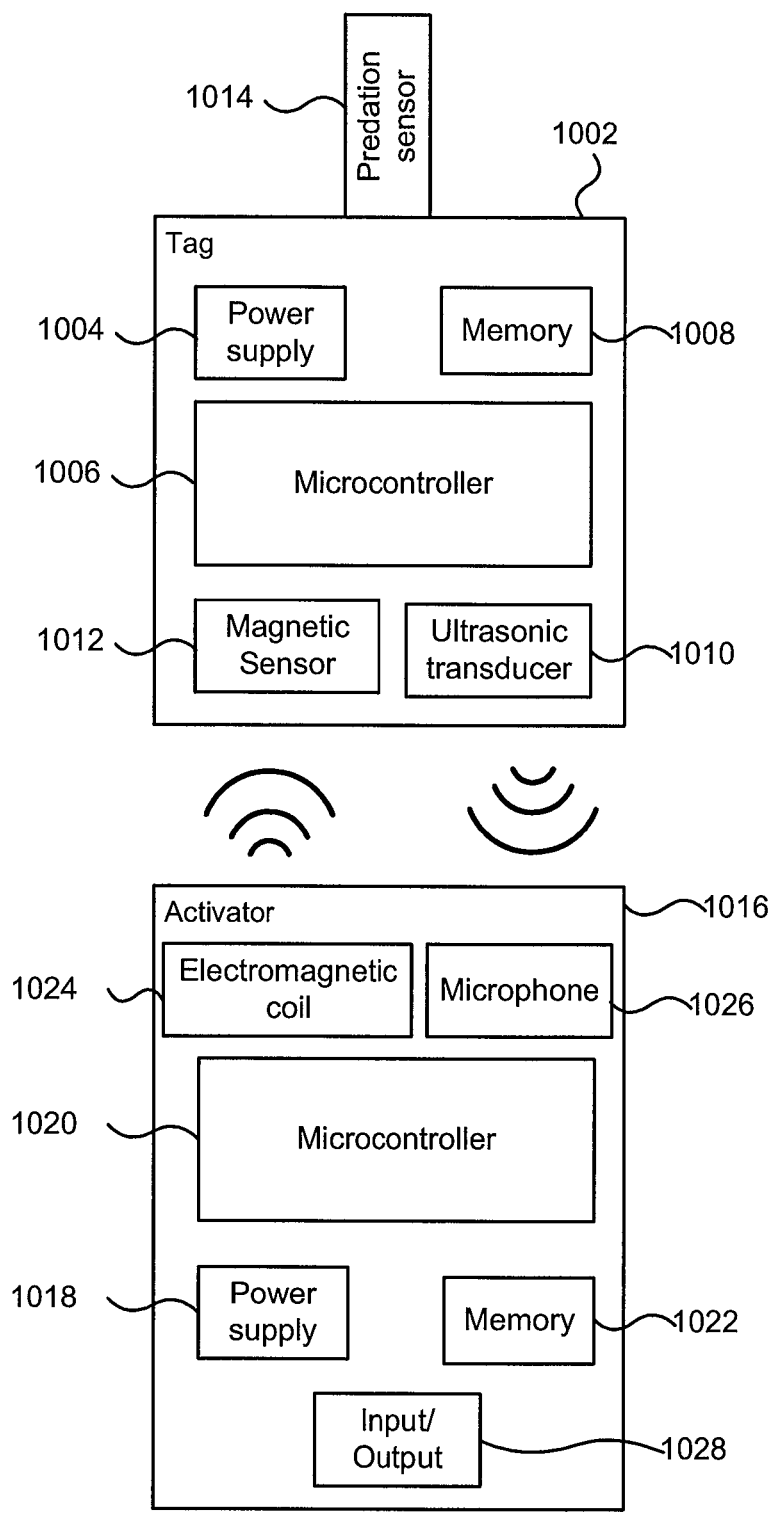
FIG. 10 depicts components of a predation tracking tag and an activator.

FIG. 10 depicts components of the tracking tag of FIGS. 2A-C and an activator. As described above, an activator may be used to activate a tag. A tag 1002 may comprise a power supply 1004, such as a battery, a microcontroller 1006, or other type of circuit for controlling the operation of the tag 1002. The tag 1002 may also include memory 1008 for storing instructions and/or data. Although depicted as being a separate component from the microprocessor 1006, the memory 1008 or at least a portion of the memory 1008 may be part of the microcontroller 1006. The tag may further comprise an ultrasonic transducer 1010 for transmitting information, such as the unique ID, when the tag is activated. The tag 1000 may also include a magnetic sensor 1012 that is used to receive instructions from the activator. Further, as described above, the tag 1002 may include a predation sensor 1014 for measuring a characteristic of the tag that will change when in an acidic environment.

The activator 1016 includes a power supply 1018, a microcontroller 1020 for controlling operation of the activator as well as memory 1022 for storing instructions and/or data used by the microcontroller 1020. The microcontroller 1020 may control an electromagnetic coil 1024 in order to generate a magnetic field used to communicate commands to the tag when the tag is located within the generated magnetic field. The commands may include commands for activating and/or deactivating the tag as well as for setting operational parameters of the tag. The activator 1016 may include a microphone 1026 for detecting the ultrasonic pulses transmitted by the tag once activated. Although not depicted, the activator may include a display for displaying the unique ID of the tag. The activator 1016 may include input/output components 1028 in order to allow a user to interact with the activator 1016 to activate and de-activate, as well as possibly configure tags.

Figure 11:
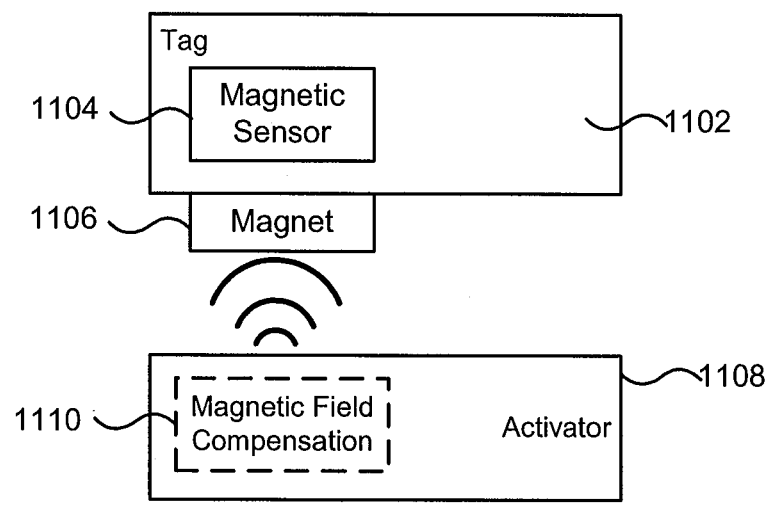
FIG. 11 depicts components of a further predation tracking tag and an activator.

FIG. 11 depicts components of a predation tracking tag and an activator. The tag 1102 is similar to the tag 1002 described above with reference to FIG. 10 and as such only the differences are depicted. Also, the activator 1108 is similar to the activator 1016 and as such only the differences are depicted. The tag 1102 uses the magnetic sensor 1104 to detect the presence or absence of a magnet 1106. As described above, the magnet 1106 can be affixed to the tag using the pH sensitive material. While the magnet 1106 provides a convenient means for detecting a predation event, its presence near the magnetic sensor 1104 may overwhelm the magnetic field generated by the activator and make the activation process difficult. The activator 1108 may include magnetic field compensation functionality 1110 for overcoming the magnetic field of the magnet 1106 in order to communicate with the tag. The magnetic field compensation functionality 1110 may generate a varying magnetic field in order to determine the magnetic field required to cancel, or counteract, the magnetic field of the magnet 1106. Once the activator determines the magnetic field required to compensate for the presence of the magnet 1106, it can be used as a base line in varying the magnetic field to allow communication between the activator 1108 and tag 1102. With the magnetic field of the magnet 1106 cancelled at the sensor 1104 by the base line magnetic field compensation, the magnetic sensor 1104 can detect changes in the magnetic field caused by the activator, and as such the activator may communicate with the tag 1102.

Once a tag is activated it may be implanted into a coelomic cavity of a marine animal, or otherwise attached to the animal, and the animal may be released and tracked using the tag.

Figure 12:
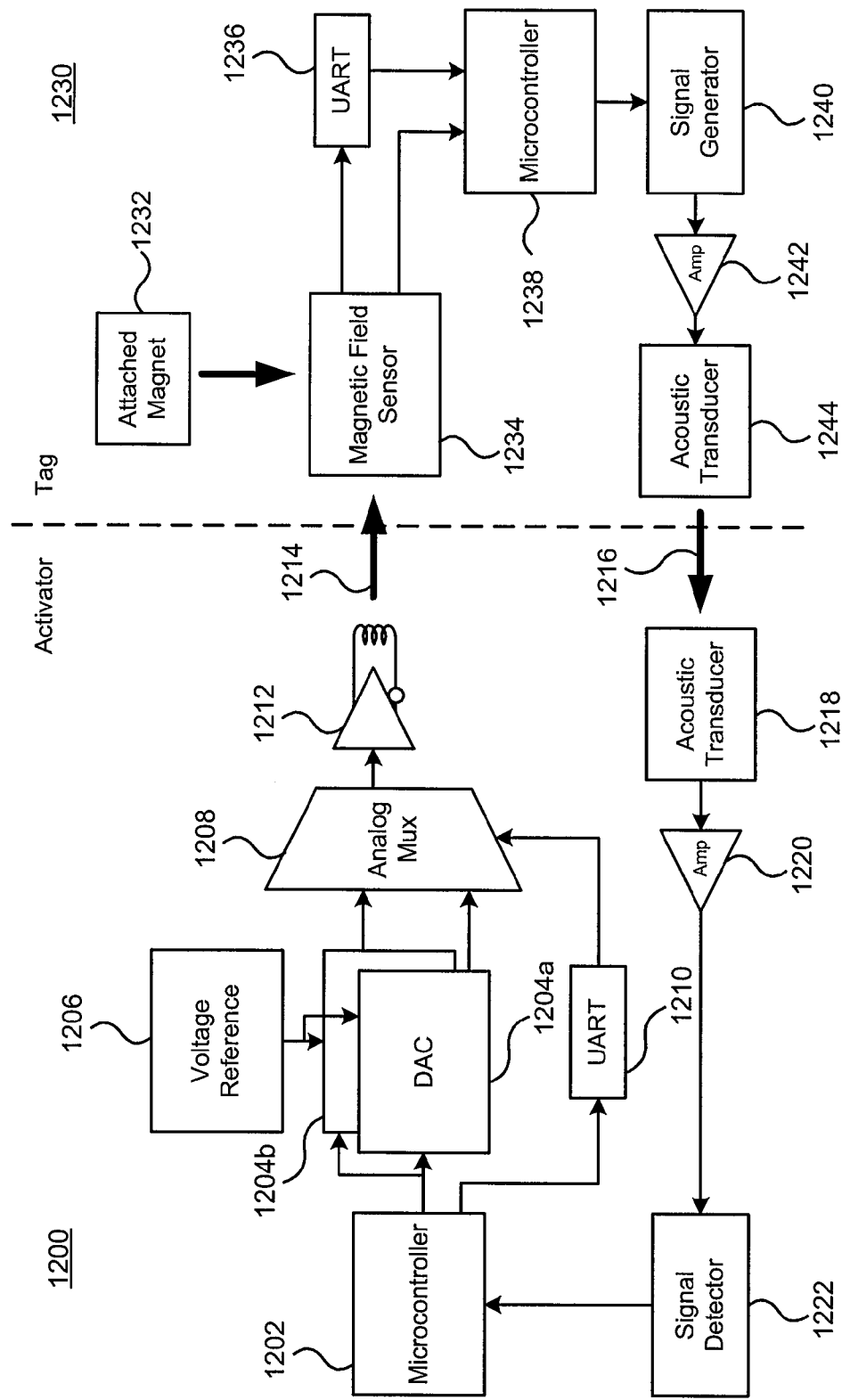
FIG. 12 depicts components of the predation tracking tag of FIGS. 8A-C and an activator.

FIG. 12 depicts components of the predation tracking tag of FIGS. 8A-C and an activator. The activator 1200 comprises a microcontroller 1202 that controls a number of digital to analog converters (DACs) 1204a, 1204b (referred to collectively as DACs 1204) and a Universal Asynchronous Receiver/Transmitter (UART) 1210. A reference voltage 1206 is supplied to the DACs 1204, whose outputs are provided to an analog multiplexer 1208. The output of the analog multiplexer 1208 is controlled by the UART 1210 and supplied to a coil driver 1212 to produce a magnetic field 1214. In order to receive information from the tag 1230, the activator includes an acoustic transducer 1218 that detects acoustic signals 1216 from the tag. The output of the acoustic transducer 1218 is provided to an amplifier 1220 to amplify the signal which is provided to a signal detector 1222 and the results supplied to the microcontroller 1202.

The tag 1230 includes a magnetic field sensor 1234. The magnetic field sensor 1234 may use a GMR (giant magnetoresistive) sensor, but alternative designs could use a mechanical reed switch, Hall effect sensor or other type of sensor. Typically, these sensors have a digital output that will output a "1" if an external magnetic field is present, and a "0" if no magnetic field is present, or vice versa. Typically a minimum magnetic field level is required in order for these sensors to indicate that a field is present. The magnetic field sensor provides its output to a UART 1236, which provides it to a microcontroller 1238. Alternatively, the magnetic field sensor output may be provided to the microcontroller 1238. The microcontroller processes the magnetic field information in order to control operation of the tag. The microcontroller may output information to a signal generator 1240 which generates a signal that is amplified by an amplifier 1242 and provided to an acoustic transducer 1244 that produces an acoustic signal 1216. As described above, the acoustic signal 1216 may be detected by the activator 1200.

When the predation detection magnet 1232 is attached to the tag 1230, the magnetic sensor 1234 will detect the field of the magnet 1232 and will indicate the presence of the magnetic field in its output. Without additional magnetic fields applied, the output will remain the same until the magnet is removed, either manually or by a predation event. Unfortunately this means that sending data into the tag becomes more difficult since simply varying a magnetic field will not be detected. In order to send data into the tag 1230, the activator 1200 has to apply a magnetic field with equivalent strength and opposite polarity, so that the magnetic sensor 1234 detects that no field is present. That is, the activator must apply an opposite magnetic field in order to counter act the magnetic field of the magnet.

The activator may generate a fixed magnetic field to counter act a known magnet strength. However, generating a fixed magnetic field may not be reliable since the magnetic field to be countered may vary from tag to tag. The magnet attached to the tag could be affixed in two different polarities as the magnets are relatively small at approximately 1×0.5 mm and don't have the poles labeled. Determining the orientation of the poles during assembly would be difficult. Further, the magnetic field of the magnet may have some variation on its field strength due to manufacturing/material tolerances. Additionally, the distance between the magnet and the magnetic field sensor may vary, due to mechanical variation in the construction of the case, thickness of base pH sensitive film, and positioning variation when the product assembler attaches the magnet to the tag. Finally, the customer using the tag activator could insert the tag into the activator in two possible orientations. The overall effect is that it is impractical to apply a fixed magnetic field level to the tag which would reliably cancel the predation magnet field and permit reliable data communication.

As described further below, it is possible to calibrate the activator in order to counter act the magnet's field and so allow communication between the activator and the tag. The activator may configure one of the DACs 1204a to provide an output that will generate the counter acting magnetic field and so cause the magnetic field sensor 1234 of the tag to indicate that no field is detected. The second DAC 1204b may be configured to provide an output that will generate a complementary field to cause the magnetic field sensor 1234 of the tag to indicate that a field is detected. The UART may then control the analog multiplexer in order to select which of the signals is used to drive the coil 1212 and so generate the magnetic field.

Figure 13:
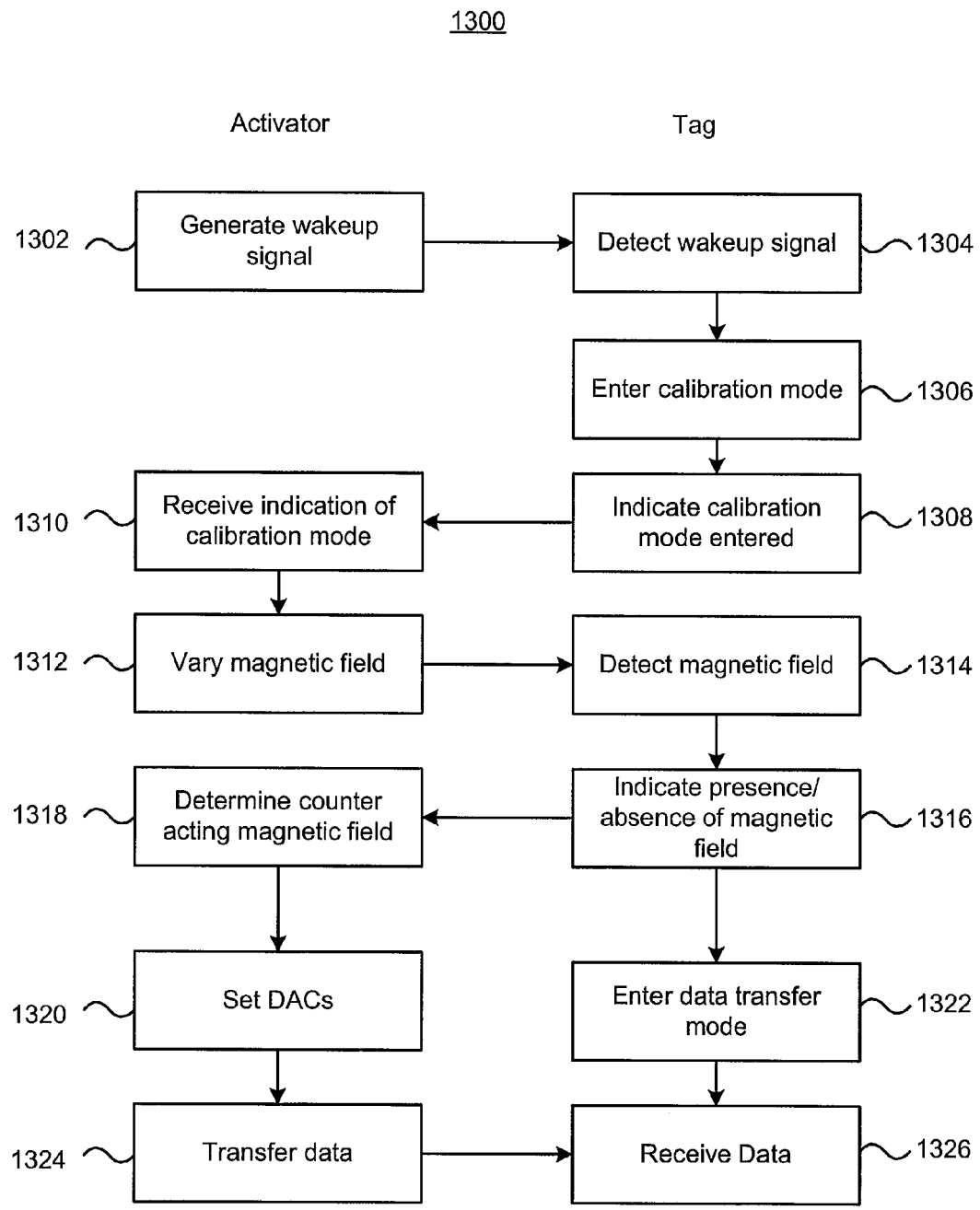
FIG. 13 depicts a method of activating a tracking tag.

FIG. 13 depicts a method of activating a tag. When a tag is inserted into the activator, the tag is placed in a calibration mode in order to determine the counter acting magnetic field. Once the calibration is performed, data can be transferred from the activator to the tag. The method begins with generating a wakeup signal (1302). The wakeup signal may be a rapidly varying magnetic field. For example a triangular 100 Hz waveform may be generated. The varying magnetic field is detected at the tag (1304). The varying magnetic field will at certain points counteract the magnet's field and as such cause a change in the detected magnetic field. In normal operation, the magnetic field will not vary quickly over time and as such, when the tag detects the varying field, the tag can enter a calibration mode (1306). The tag may indicate that it has entered into the calibration mode (1308) to the activator by sending an appropriate pulse train from the ultrasonic transducer. The activator receives the indication that the tag has entered the calibration mode (1310) and begins varying the magnetic field (1312) which is detected at the tag (1314). The tag indicates the presence or absence of a detected magnetic field (1316) to the activator. The activator determines the counter-acting magnetic field (1318) that caused the tag to detect no magnetic field and sets the DACs (1320) used to generate the magnetic fields representative of '0' and '1'. The tag enters the data transfer mode (1322) and the activator begins to transfer data (1324) which is received at the tag (1326).

Figure 14:
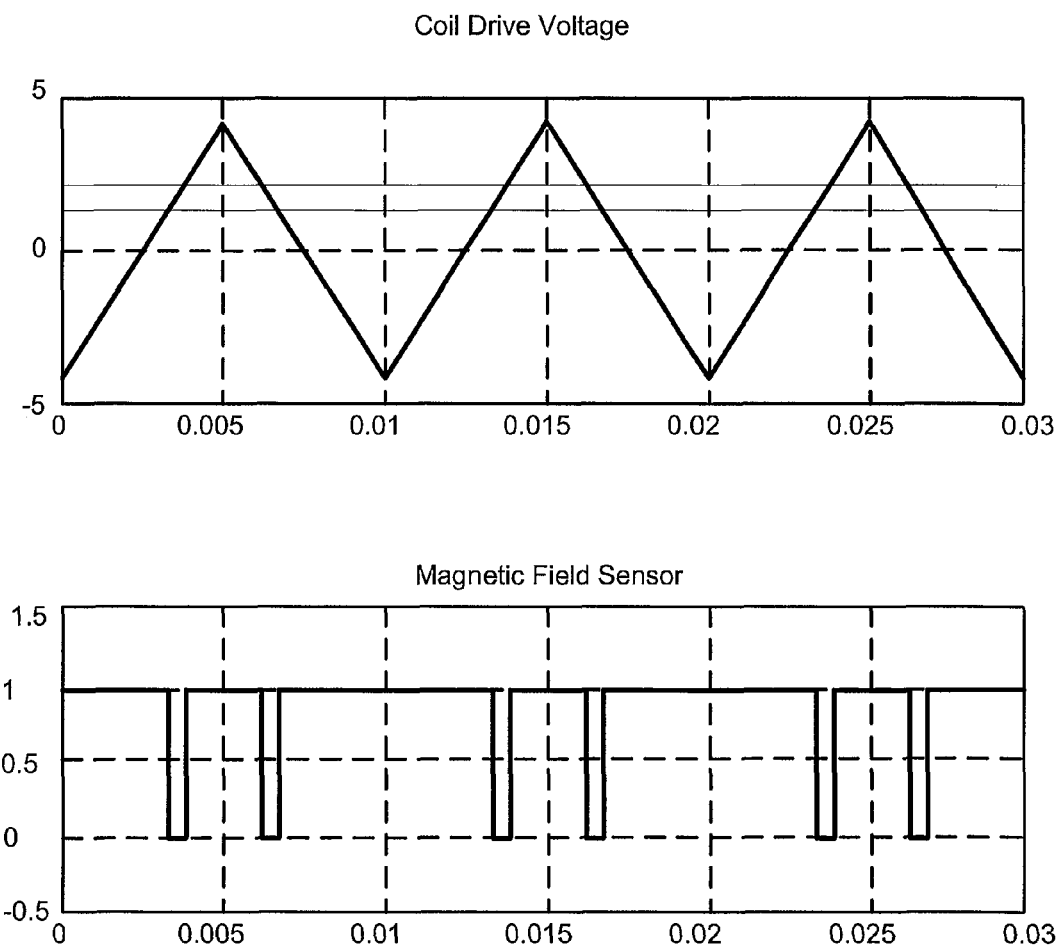
FIG. 14 depicts signals associated with activating a tag.

FIG. 14 depicts signals associated with activating a tag. Initially, the activator first drives the coil with a full-scale triangle wave at a frequency of 100 Hz as depicted FIG. 14. This results in a fairly distinctive "double pulse" signal from the magnetic field sensor depicted in FIG. 14. The tag detects the double pulse signal and enters the calibration mode. Detection of the waveform in the tag can be accomplished by determining if the magnetic field sensor value is different from a previous sensed value, and if it is different keep the magnetic field sensor on and observe the sensed value for the next 20 ms or more. If the magnetic field sensor values appear to be rapidly changing, the magnetic field sensor output is observed for a fixed period of time and the number of transitions in the value is counted. If the frequency is within the expected 200 Hz range (two transitions for each triangular pulse at 100 Hz) the tag enters the calibration mode. Upon detecting the varying signal, the tag pings out a distinctive sequence of pings, which are different from its usual PPM ping train, to tell the activator that it's entering calibration mode. Although depicted as a triangular waveform having a frequency of 100 Hz, it is possible for the wave form to have different frequencies or shapes. For example, the signal may have frequencies ranging from approximately 10 Hz, or less, to approximately 1 kHz or more. The frequency range of between 10 Hz and 1 kHz is only illustrative, and the frequency may be greater than 1 kHz or less than 10 Hz.

Once the tag is in the calibration mode, the activator attempts to determine the DAC setting required for counteracting the magnet's magnetic field. In the calibration mode, the tag keeps its magnetic field sensor powered on. If the magnetic field sensor detects the absence of a magnetic field, the tag will continuously ping, otherwise the tag will remain silent. For accuracy, the tag may ping immediately after the magnetic field sensor detects the absence of a magnetic field.

If the magnetic field sensor is held low for a sufficiently long and uninterrupted time, then the tag enters data transfer mode. If the magnetic field sensor does not go low for a long period of time, it is assumed that a fault occurred in the activation process and the tag may go back to regular operation.

In calibration mode, the activator may search for the "zero point", that is the DAC setting that counteracts the magnet's magnetic field at the sensor by the following method of the following pseudo code. In the following, it is assumed that 'DAC0' is the first DAC used for generating the counteracting magnetic field and that the DAC values can vary between 0 and 4095.

```
Start with the magnetic field at zero (DAC=2048)
    ○ If the tag pings, there's no magnet present - set
        DAC to 2048 and return;
Increase the DAC setting until:
    ○ DAC=4095 is reached;
    ○ Or the tag pings;
If the tag pinged:
    ○ Record the DAC setting;
    ○ Set the DAC value to 4095;
    ○ Slowly decrease the magnet field (decrement DAC
        setting) until the tag pings;
    ○ Record the second DAC setting;
If DAC reached 4095:
    ○ Set the magnetic field back to zero (DAC=2048);
    ○ Decrease the DAC setting until the tag pings;
        Record the DAC value;
    ○ Set the DAC value to 0;
    ○ Increase the DAC value until the tag pings.
        Record the DAC value;
Set the DAC0 value to the average of the two recorded
    values.
```

The activator then holds the 'DAC0' value, until the tag stops pinging. Once the counteracting magnetic field is calibrated, the tag may be placed in a data transfer mode in which the activator sets the first DAC to the 'DAC0' value calculated and set the second DAC to a suitable value 'DAC1' that will ensure that the magnetic sensor detects a magnetic field. The value may be determined according to:

```
If (DAC0 <2048) then DAC1 = 4095;
Else DAC1=1
```

Once the DACs are set, the data can be transmitted to the tag by switching the multiplexer output to select which DAC drives the coil.

Figure 15:
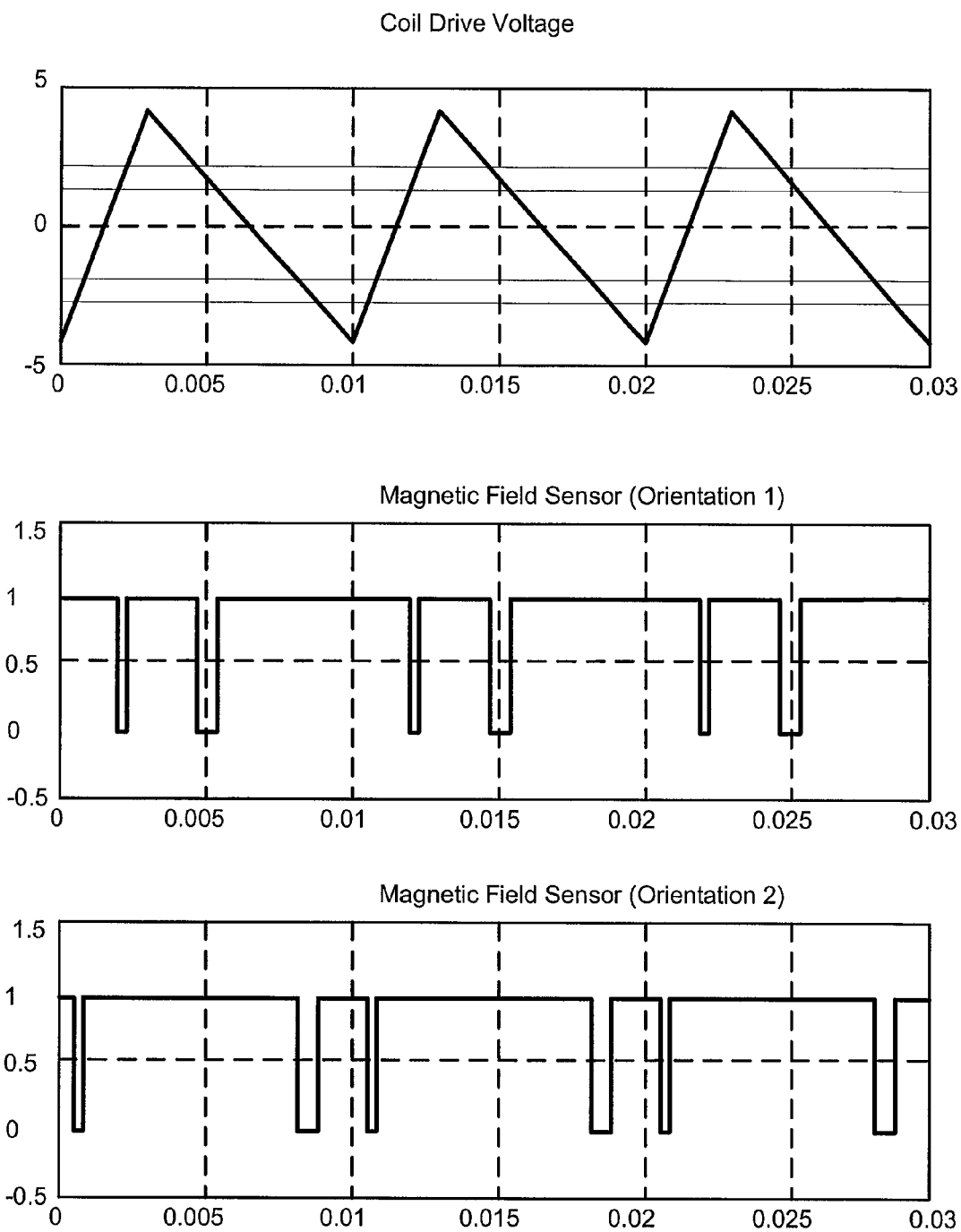
FIG. 15 depicts further signals associated with activating a tag.

FIG. 15 depicts further signals associated with activating a tag. As described further with reference to FIG. 15, it is possible to determine the DAC setting required for counteracting the magnetic field of the magnet at the tag. It is possible to combine the activation and calibration waveforms into a single step—the tag observes the waveform coming out of the magnetic field sensor, calculates a calibration value and reports the calculated value to the activator.

This method requires the magnetic field sensor to be detected with a hardware timer in the tag's microcontroller, or with fast running code on the tag's microcontroller, in order to measure time delays with reasonable accuracy. To wake up the tag, the activator applies an asymmetrical, saw-tooth waveform to the coil as depicted in FIG. 15. The coil driving signal has a rise time of approximately 3.33 ms, a fall time of approximately 6.67 ms, and a period of 10 ms (100 Hz). Although depicted as a triangular waveform having a frequency of 100 Hz, it is possible for the wave form to have different frequencies or shapes. For example, the signal may have frequencies ranging from approximately 10 Hz, or less, to approximately 1 kHz or more. The frequency range of between 10 Hz and 1 kHz is only illustrative, and the frequency may be greater than 1 kHz or less than 10 Hz. Further, the rise and fall times may vary based upon the asymmetry of the waveform.

The resulting signal coming out of the magnetic field sensor, depicted in FIG. 15 is similar to the previous "double pulse" waveform, except that the two pulses have different lengths. Whether the narrow or wide pulse comes first depends on the magnetic field polarity required to cancel the predation magnet. Once the tag determines the presence of the wakeup signal, the tags measure the following delays:
T1 Width of first pulse
T2 Width of second pulse
T12 Time delay from end of the first pulse to start of the second pulse Given these values, the tag can calculate the required calibration value with the method of the following pseudo code:

```
If (T2 > T1) {
    DACH = 4095 - (T12 * k1);
    DACL = DACH - (T2 * k2);
    DAC0 = (DACH + DACL) >> 1;
} else {
    DACL = (T12 * k1);
    DACH = DACH + (T1 * k2);
    DAC0 = (DACH + DACL) >> 1;
}
``` k1 and k2 are constants derived from the waveform frequency, waveform duty cycle and the units of measure of T1, T2 and T12.

The resulting 'DAC0' value, which may vary between 0 and 4095 for example, is pinged back to the activator using a distinct PPM sequence, different from a usual PPM ping. The tag may then enter data transfer mode.

The activator then sets its 'DAC0' value to the provided value, sets 'DAC1' to a suitable complimentary value, and begins data transfer.

Figure 16:
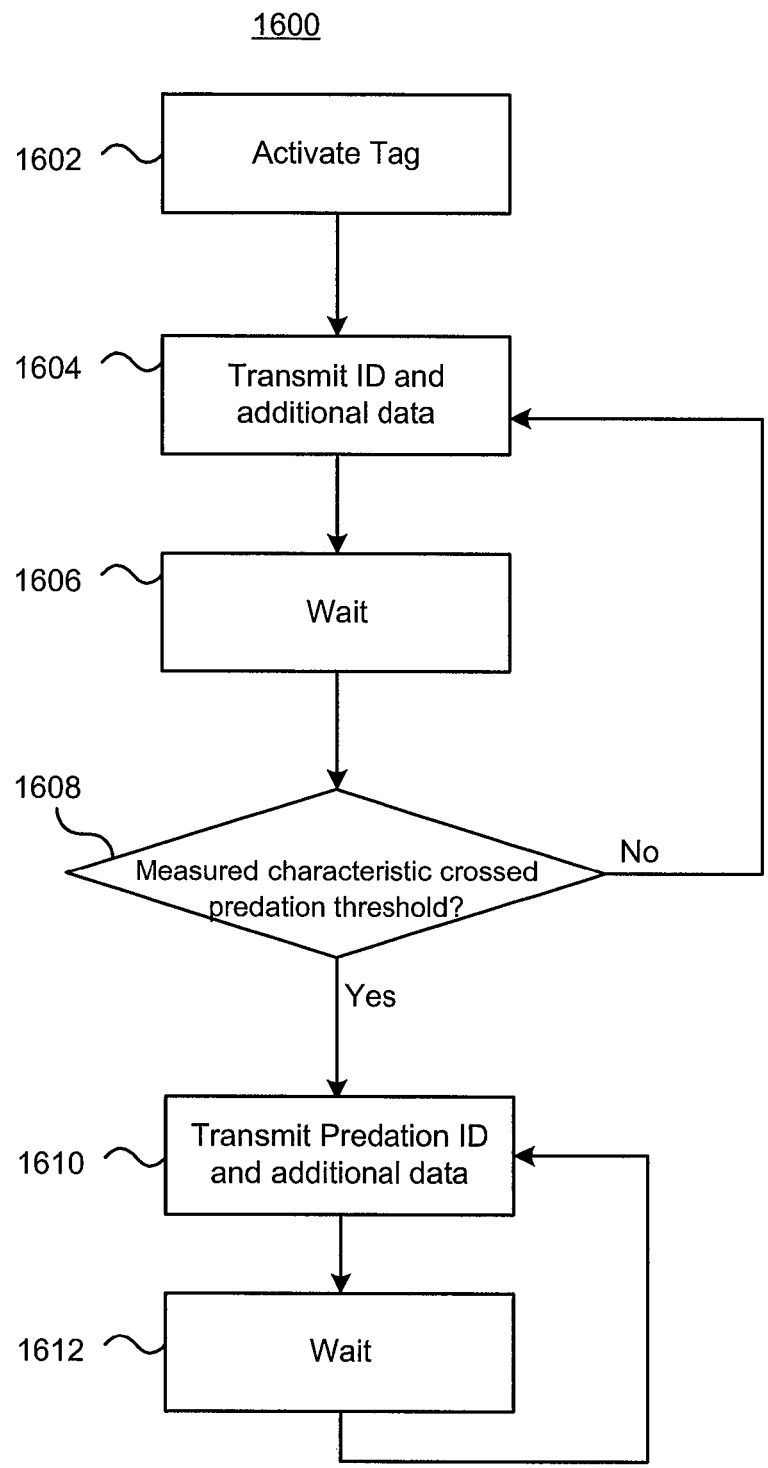
FIG. 16 depicts a method of operating a tracking tag.

FIG. 16 depicts a method of operating a tracking tag. The method 1600 begins when a tag is activated (1602) and implanted into a coelomic cavity of an animal. The animal may then be released back into the body of water, with the tag operating to periodically transmit its unique ID. The tag transmits its ID and any other additional data (1604), such as sensor information including temperature sensors, acceleration sensors or any other sensors. Once the ID has been transmitted the tag waits (1606) for a period of time. The period of time that the tag waits for may vary. However, once the wait period is over, the tag determines if a detected characteristic crossed a predation threshold (1608). The predation threshold provides an indication of detected characteristic values that are associated with the tag being in an acidic environment. If the detected value has not crossed the predation threshold (No at 1608) the tag transmits its ID and any additional data again (1604). If the detected value has crossed a predation threshold (Yes at 1608), a predation event has occurred, and as such the tag may change its operating mode. The tag may begin to transmit a predation ID (1610), which differs from the regular tag ID, in order to indicate that a predation event has been detected. The tag may also transmit additional data such as temperature readings or values from other sensors. After a predation event has been detected, it is no longer necessary to check if the predation threshold has been crossed, and as such the tag may wait (1612) for a period of time before transmitting the predation ID again (1610).

The predation tags described above utilize a pH sensitive material that degrades preferably quickly in an acidic environment, but does not degrade in a neutral or basic environment. As described further, various pH sensitive materials were developed and tested for their appropriateness in use with predation tags. The pH sensitive material should be robust enough to survive months inside the body cavity of a fish where the tag is implanted, yet break down relatively rapidly once predation occurs.

Chitosan was used in creating pH sensitive material. The chitosan pH sensitive material may be formed from casting a slurry and evaporating a solvent of the slurry. Swelling and degradation properties of the chitosan can be affected by different additives such as plasticizers and cross-linkers. Results of tests done on various chitosan slurries as well as the use of the slurry on tags are set out further below.

Medium molecular weight (approximately 750,000 Daltons) chitosan were used in the preparation and testing of the pH sensitive material. The chitosan was purchased from Sigma Aldrich™. It is low cost with 88% deacetylation, as determined via NMR analysis. The chitosan can be dissolved in solution and then cast as a film or used as an adhesive. The properties of chitosan and its film can be tailored based on the degree of deacetylation, crystallinity, purity, molecular weight of the sample, pH of the environment, presence or absence of plasticizing agents, crosslinking, drying and isolation conditions, and the acid used in the solvent. Various slurries of chitosan were tested to determine the rate of degradation in simulated coelomic fluid, the degree of swelling in simulated coelomic fluid, and the time to break down in an acidic solution. It is desirable that the material be stable in the ventral body cavity of a fish yet quickly dissolve in the primitive stomach of predators.

Chitosan can be dissolved in a protic solvent to obtain a uniform slurry that can be cast as a film or utilized as an adhesive. In the case of film formation, the solvent is allowed to evaporate over a period of time. The composition of the solution, presence of additives, and evaporation conditions have all been shown to effect the properties of the resultant product.

The most influential factor on the properties of the resultant product is the choice of solvent mixture. Four acidic aqueous solutions were considered for solvation of the chitosan. The solutes included L-ascorbic acid, citric acid, acetic acid, and hydrochloric acid. The results of the solute testing are presented in Table 1.

TABLE 1

Effect of various solutes on chitosan film formation.

| Solute | Test Results |
|---|---|
| L-ascorbic acid | Films showed evidence of extreme decomposition over time in air. |
| Citric acid | Films showed good adhesion and toughness when wet. Films showed excess swelling when placed in water and contracted upon drying. Films were not flexible when dry. |
| Acetic acid | Films did not adhere well. Less noticeable swelling when wet. Slight wrinkling of edges while drying. Films maintained a good degree of flexibility when dry. |
| Hydrochloric acid | Films were brittle. Higher concentration of HCl caused hydrolysis. |

As can be seen from table 1, acetic acid and citric acid showed the most favorable results and were used for further testing. The use of a plasticizing agent can improve the characteristics of the materials cast with acetic acid as described further below. Citric acid materials did not show improved characteristics with plasticizer and as such slurries with acetic acid were focused upon.

Adhesion of films and slurry to substrate materials such as epoxy and parylene may be important to ensure that the film remains adhered to the tag. Studies of chitosan slurries with acetic acid focusing on adhesion of the film on a substrate were performed. While drying, often the film would show poor adhesion and peel up. It was found that the adhesion of the film to the substrate could be improved by sanding the surface of the substrate with 600 grit sandpaper. The sanding increased the surface area and allowed for strong adhesion, with no resulting peeling or curling at the edge of the films. All films passed a scratch and tape test once the surfaces had been sanded. A scratch test is simply scratching the surface of the film with a fingernail, while the tape test was done by adhering a one inch piece of STAPLES™ brand scotch tape and removing it quickly. A test was considered positive if the film remained intact after the test. Chitosan films were tested for their adhesion to a parylene coated surface and epoxy pucks. The chitosan showed good adhesion to the parylene. After sanding, the chitosan film showed good adhesion to the epoxy pucks. Generally, good adhesion was observed after the surface area was increased by sanding and all passed the scratch and tape tests.

The films of chitosan cast in acetic acid were flexible and strong. In order to test the swelling and degradation characteristics of the films as well as the effect of additives on the films, the films were tested in simulated coelomic fluid (SCF). The SCF was made to mimic the conditions inside the body cavity of a fish that are typical of marine fish. The SCF was composed of: 0.02 mM HEPES buffer solution (83264-500ML, Sigma Aldrich), 124.1 mM NaCl (Sigma Aldrich), 5.1 mM KCl (Sigma Aldrich), 1.6 mM $CaCl_2.H_2O$ (Sigma Aldrich), and 1.0 mM $MgSO_4.H_2O$ (JT Baker). The pH of the solution was adjusted to 8.20 using 1 M NaOH. Solutions used in biological studies also often include dextrose and penicillin. These were omitted here as they are considered to have little influence on the ionic conductivity and degradation of the films. Also, dextrose could allow bacteria to grow on the samples during long-term studies.

The films were allowed to sit in 5 mL of the SCF for different periods of time. During these periods the solutions were agitated daily and the fluid was replaced every three days to imitate the natural replenishment of the coelomic fluid in a living fish.

Before the films were placed in the SCF they were weighed to get their initial dry mass. After allowing them to sit in the SCF for a specified amount of time they were removed from the fluid. They were patted dry and weighed immediately to get the wet mass. The films were then allowed to dry for the period of a week and then weighed again to get the dry mass after the trial. Using these three different masses (dry mass, wet mass, and dry mass after trial), the swelling and degradation of the films were quantified, as follows:

$$\% \text{ swelling} = \frac{\text{wet mass} - \text{dry mass}}{\text{dry mass}} \times 100 \quad (1)$$

$$\% \text{ degradation} = \frac{\text{dry mass after trial} - \text{dry mass}}{\text{dry mass}} \times 100 \quad (2)$$

Equation (1) shows the swelling experienced by a film in the SCF while equation (2) shows the mass loss of the film, which is referred to as degradation of the same film.

A value of 100% swelling would represent a film that has doubled its mass and therefore experienced considerable swelling. It is not unusual for these thin films to take up a lot of water while in the SCF. A value of 0% swelling means that that change in mass was undetectable, but 0% swelling is not characteristic of these chitosan films. The degradation % is usually expressed as a negative, meaning that mass was lost during studies. A value of −50% degradation would signify that the film has lost half of its original mass. Typical values are around −10% degradation.

Figure 17:
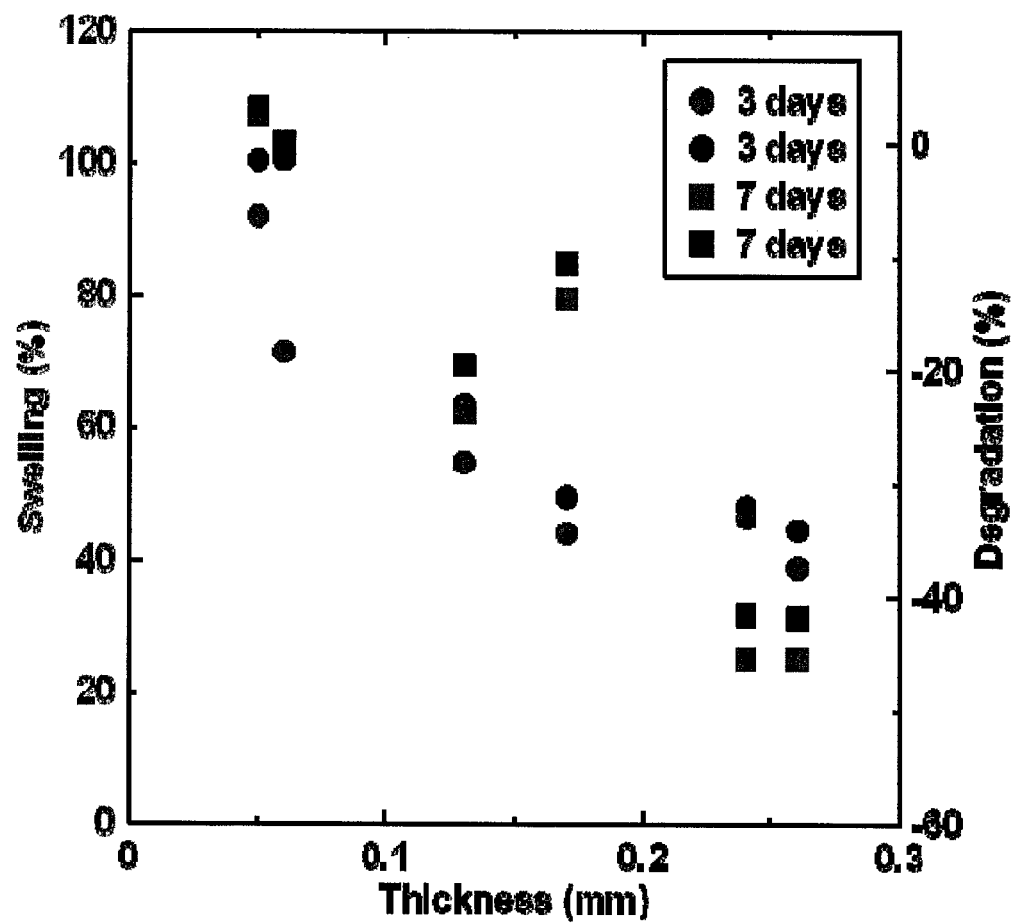
FIG. 17 shows a graph of the affect of film thickness on swelling and degradation of the films.

It was observed that the thickness of the films may drastically affect the swelling and degradation of the films, as seen in the graph of FIG. 17. Films of differing thickness, from 0.05 to 0.25 mm were placed in SCF for durations of three or seven days. The film formulation was 2% by mass of chitosan to solvent and 20% by mass of glycerol to chitosan in 0.2 M acetic acid. It was observed that as film thickness increased, the swelling and mass loss decreased.

The films prepared from pure chitosan polymer tend to be brittle and even crack upon drying. The addition of plasticizers to the film forming slurry may alleviate this problem. This addition of plasticizer may improve flexibility and possibly also the mechanical properties of the film. However, the addition of plasticizer may cause adverse effects on film properties such as increasing swelling of films in solution. When the plasticizer exceeds a certain concentration, phase separation can also occur. The amount of plasticizer used in film formation should also be small enough to avoid any non-biocompatible and toxic effects, yet large enough to increase flexibility.

Figure 18:
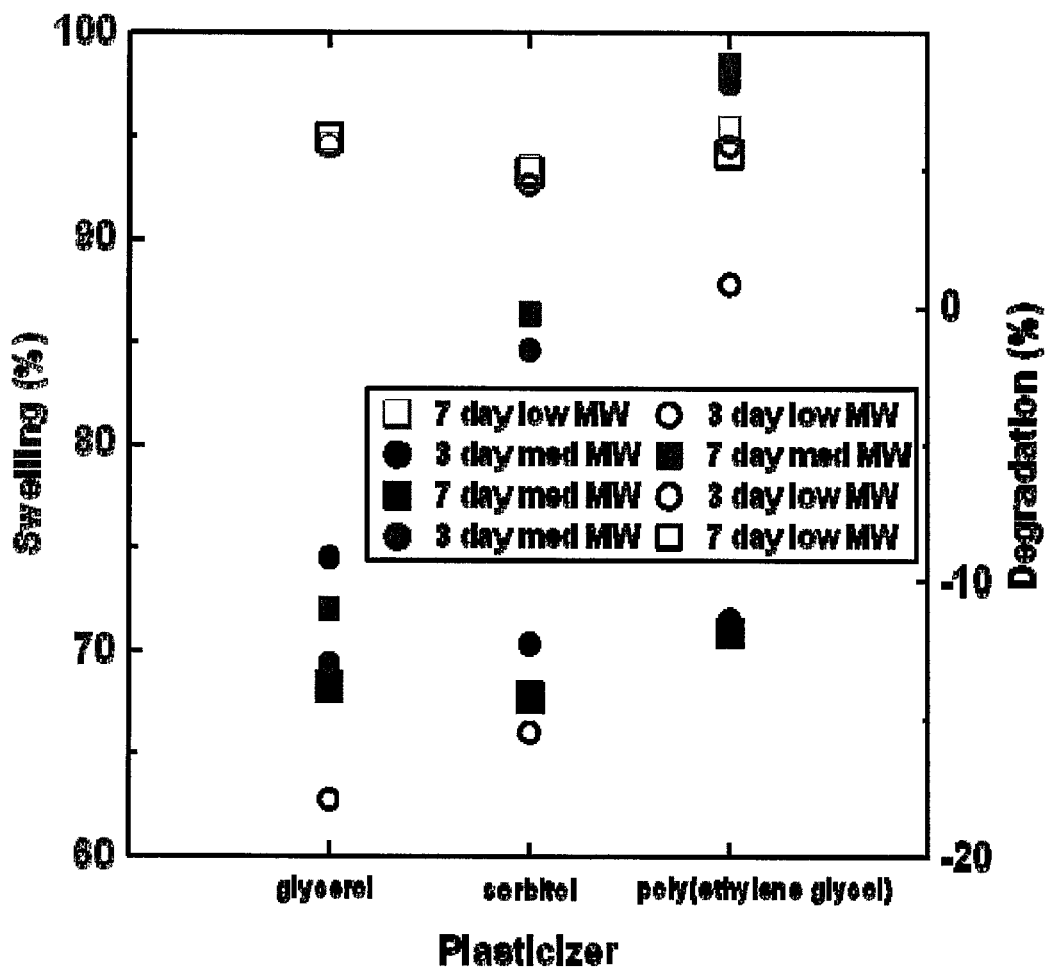
FIG. 18 shows a graph of the affect of plasticizers on swelling of the films.

Plasticizers of interest here included glycerol, ethylene glycol, poly (ethylene glycol), erythritol, oleic acid, propylene glycol, di-hydroxyl stearic acid, and sorbitol. These were selected on the basis of low cost, low toxicity, and favorable in vivo response. These are mostly polyols which may lower the glass transition temperature for the plastic, making it more flexible at the temperature at which it will be used. This means durability should increase as a result. Of these plasticizers, glycerol, sorbitol, and poly (ethylene glycol) are readily available and low cost. Tests were done on films cast with these three plasticizers and results are shown in FIG. 18.

Two forms of chitosan were used for this plasticizer test: medium and low molecular weight chitosan polymers. Each of these chitosans was tested with the three plasticizers. An amount of 20% by mass of each plasticizer to chitosan was added to the chitosan slurry for testing. The low molecular weight chitosan displayed similar results for all plasticizers in terms of swelling (tested at 7 days and 3 days), and degradation (tested at 7 days). However, medium molecular weight chitosan was more tunable with the different plasticizers. Glycerol samples showed less swelling compared to those with sorbitol and poly (ethylene glycol). Degradation was about the same for all plasticizers using medium molecular weight chitosan.

Figure 19:
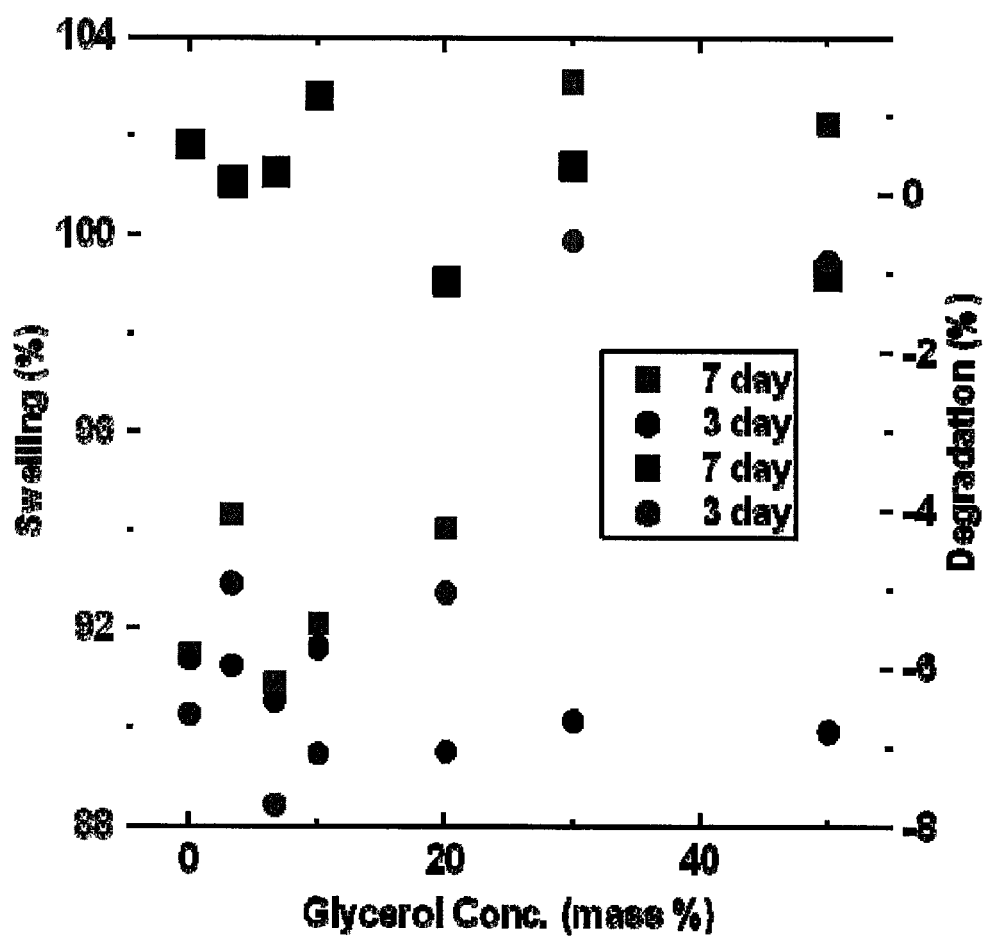
FIG. 19 shows a graph of the affect of concentration of glycerol to chitosan on swelling.

From the above, glycerol plasticizer gives the chitosan films the most favorable characteristics and was used for further testing. The influence of the amount of glycerol plasticizer in the chitosan slurry was also tested. FIG. 19 shows the influence of concentration, by weight percent, of glycerol to chitosan on swelling and degradation.

The greater the concentration of glycerol, the more swelling the films experience in SCF. Higher glycerol concentrations also lead to greater degradation. There is an apparent boundary in the glycerol concentration above which the swelling jumps to much higher values. This boundary is between 20 and 30 mass percent glycerol. The data indicates that only a small amount of glycerol is needed to produce the desired film properties. Accordingly, using 3%-20% by mass of glycerol to chitosan when forming the pH sensitive material may provide desirably low swelling, while still maintaining the film's plasticity and flexibility.

In addition to the plasticizer, the chitosan film may include cross-linkers. The use of cross-linkers serves to provide bridges or bonds between the chains of a polymer to link them together. These bonds can be either covalent or ionic. Cross-linking agents have the ability to improve film density and decrease the water absorption upon wetting in SCF, giving less swelling of the films as well as less degradation. Cross-linking also causes flexibility to decrease and hardness to increase. Overall the added interactions can strengthen the chitosan film. The polymer chitosan can be cross-linked with such compounds as sodium citrate, sodium sulfate, and calcium chloride. To cross-link, the films were simply allowed to soak in the cross-linking solution (a certain mass % of cross-linker mixed in water) for a fixed period of time, after which they were rinsed with copious amounts of distilled water to neutralize them. Sodium hydroxide was included in the slurries as it serves to basify the films which are acidic because of the acetic acid used in the formulation; however, the sodium hydroxide does not participate in the cross-linking step and induces no cross-linking. Sodium citrate and sodium sulfate both provide polyvalent anions which bind the chitosan chains to cross-link them ionically. All films were cross-linked for a period of two hours unless otherwise specified. After cross-linking the films were allowed to dry prior to further testing.

Figure 20:
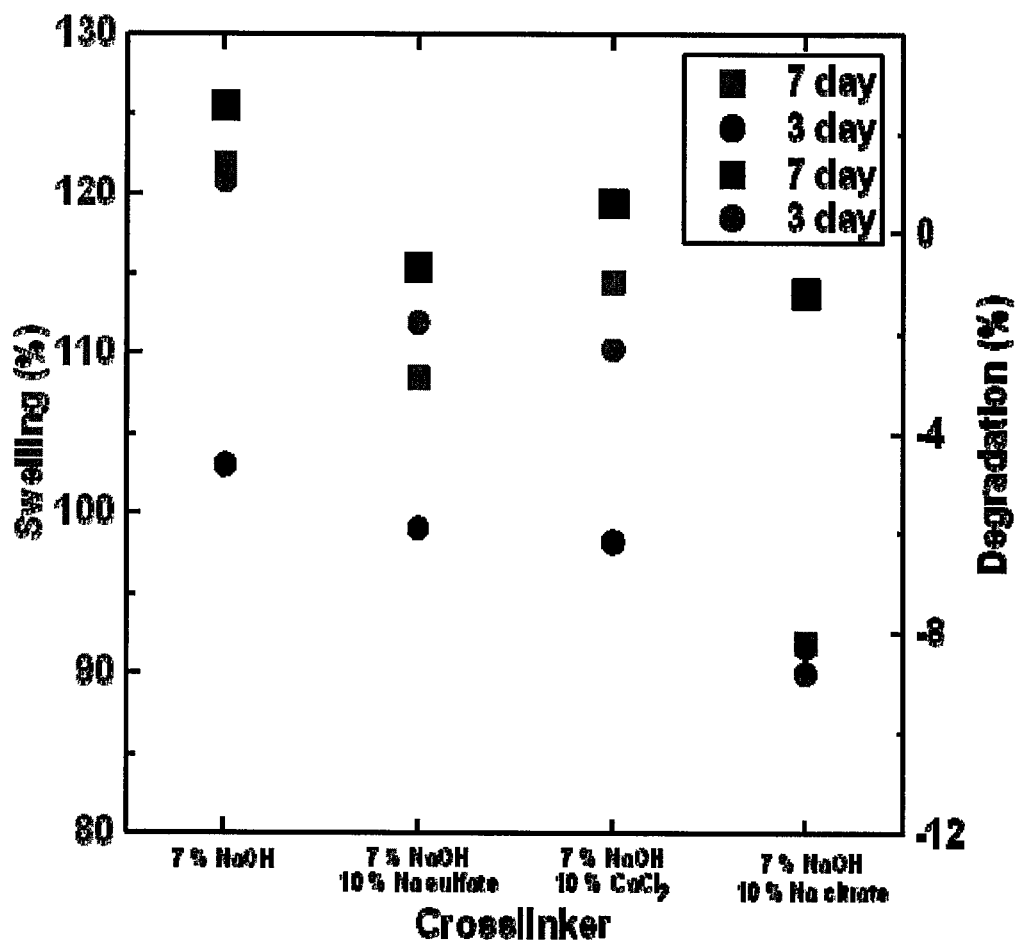
FIG. 20 shows a graph of the affect of cross-linkers on the swelling and degradation of films.

FIG. 20 shows the swelling and degradation results of films cast using 2 mass % chitosan in the slurry and 20 mass % glycerol to chitosan in 0.2 M acetic acid solvent and then treated with different cross-linkers for two hours with a specified mass % of cross-linker. Swelling was decreased when sodium citrate was used as a cross-linker compared to the others, while the control of just NaOH and no cross-linker displayed the most swelling. The degradation was not as strongly influenced by cross-linking, as all degradation values were relatively low.

Figure 21:
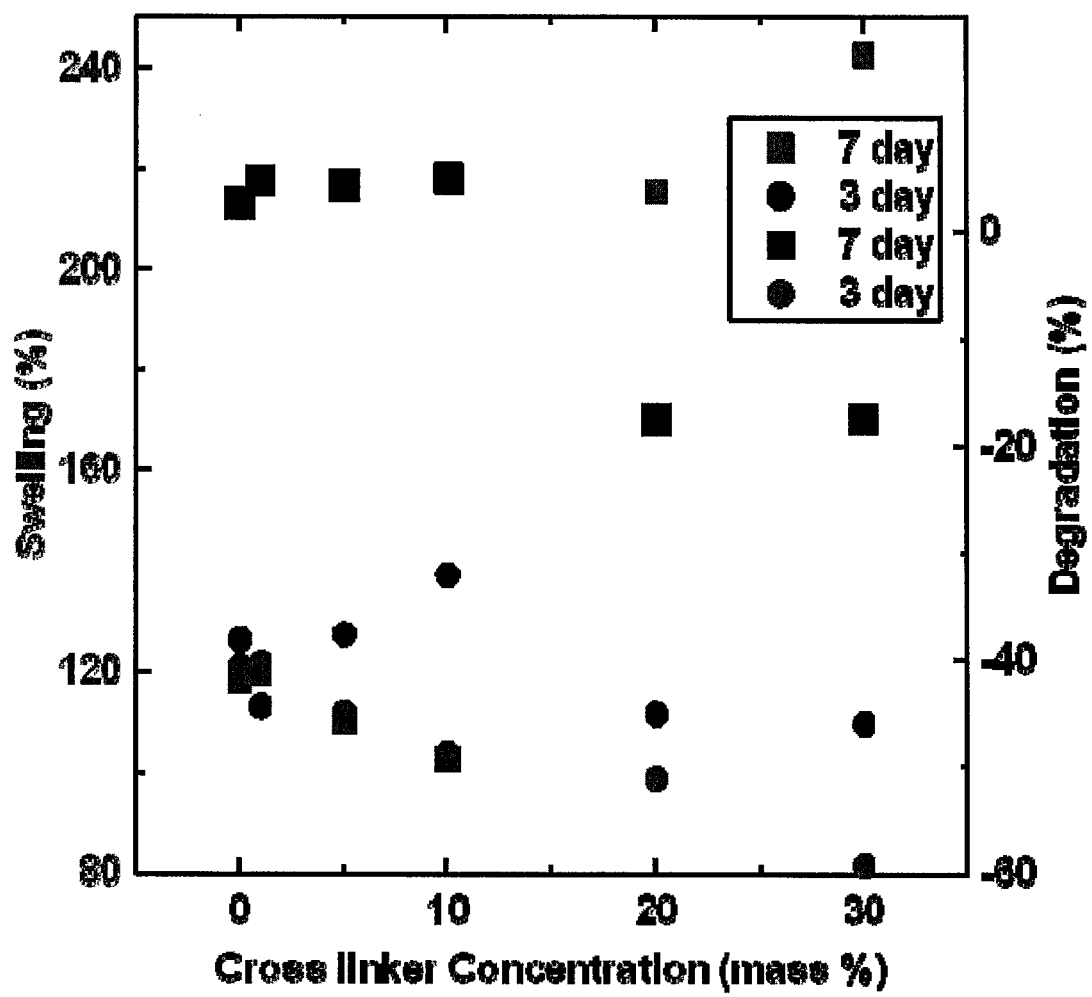
FIG. 21 shows a graph of the affect of sodium citrate concentration on swelling and degradation.

The cross-linker concentration was also tested to see its effect on the film swelling and degradation. For this test the sodium citrate, which provided low swelling and degradation, was used. A standard 7 mass % of NaOH was used along with differing concentrations of sodium citrate. Films were cast from 2 mass % chitosan in the slurry and 20 mass % glycerol to chitosan in acetic acid and water solvent. FIG. 21 shows the film swelling and degradation when changing the sodium citrate concentration from 0 to 30 mass %. Swelling at 3 days decreased as the amount of sodium citrate cross-linker was increased. The degradation did not show a regular pattern after either 3 days or 7 days, but was near zero at low concentrations after 7 days. A desirable sodium citrate concentration for cross-linking was approximately 10 mass % relative to chitosan.

Figure 22:
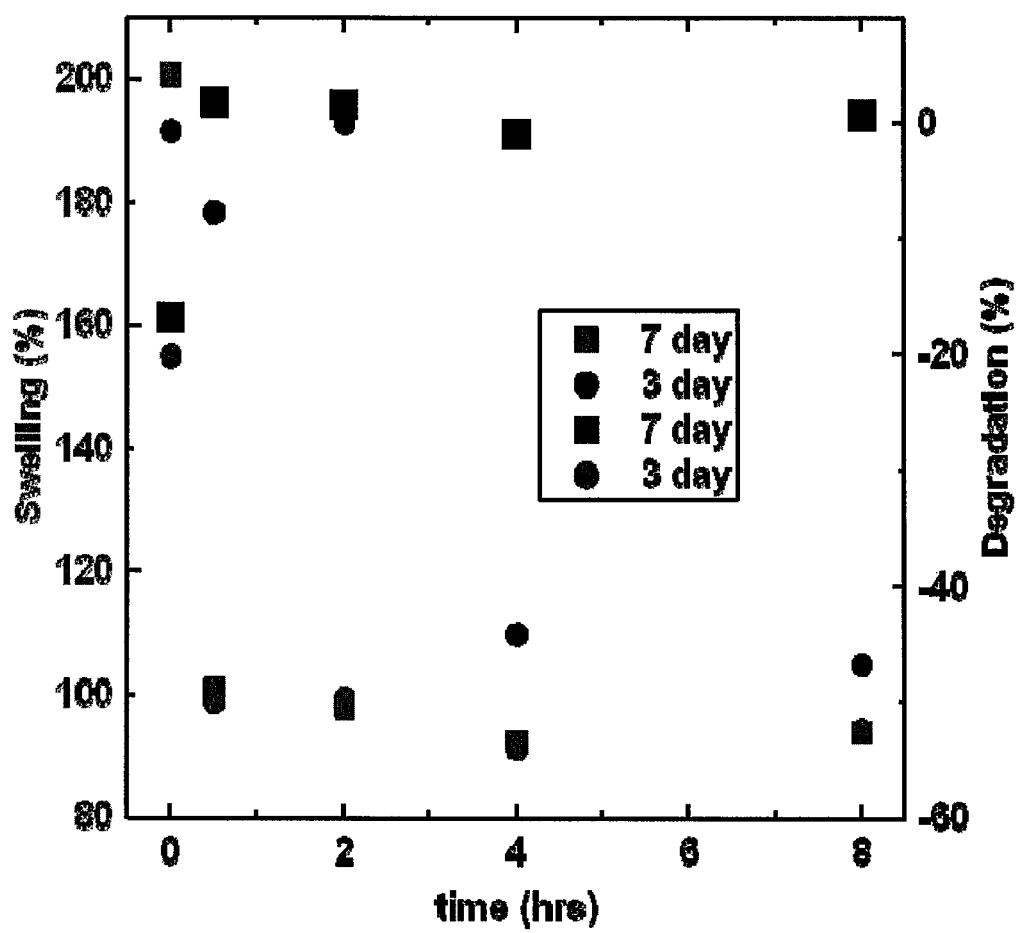
FIG. 22 shows a graph of the affect of cross-linking time on film swelling and degradation.

Another study was carried out to determine the influence cross-linking time on film swelling and degradation. The data from this study are shown in FIG. 22. The cross-linking time was varied from 0 (quick rinse) to 8 hours. Swelling was greatest for the low cross-linking times and degradation was not influenced much by the cross-linking time. A shorter cross-linking time is more desirable in terms of production. Accordingly, 30 minutes of cross-linking may provide favorable film characteristics, namely, reduced swelling and reduced degradation while providing an acceptable production time.

Overall, cross-linking is a desirable step in the formation of a chitosan film. The cross-linking with sodium citrate reduces swelling and minimizes degradation. Soaking for a half hour in 10 mass % sodium citrate relative to chitosan is sufficient to provide the desirable properties.

Figure 23:
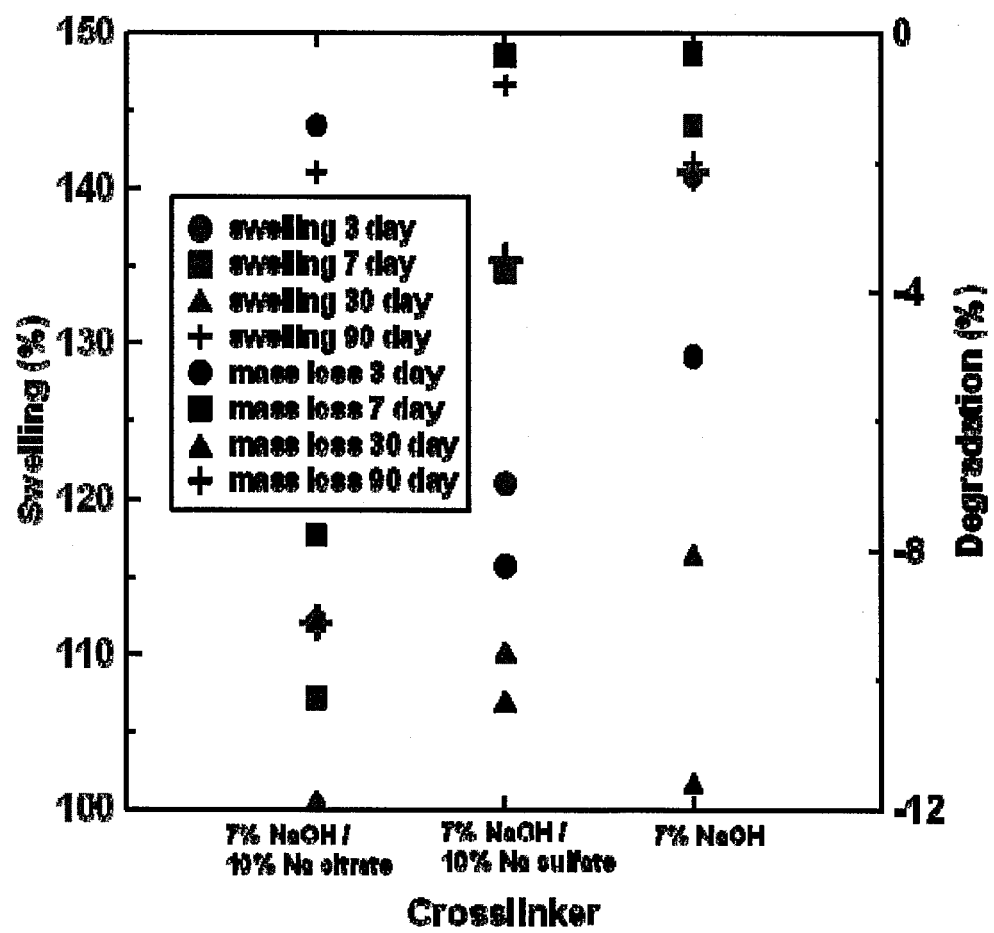
FIG. 23 shows a graph of the affect of additives on the long-term stability of the films.

Long-term degradation studies were carried out to evaluate the use of the additives described. The goals were to provide stability of the chitosan for months in the SCF, yet rapid degradation in the low pH of the fish gut. The long-term study looked at stability of the films immersed in the SCF for periods of time up to 90 days. Chitosan films were cast with 2 mass % medium molecular weight chitosan and 20 mass % glycerol to chitosan in acetic acid and water solvent for these tests. Several cross-linkers were used for this long-term study and FIG. 23 shows the results.

All of the films stood up to the SCF for the extended period of 90 days. Swelling was least in the sodium citrate cross-linked film after the 30 days (101%), while the film in the SCF for 90 days and cross-linked with sodium citrate swelled approximately 112%. The degradation in the sodium citrate cross-linked film after the 90 days was about −2%. Overall the films displayed good long-term stability in the SCF.

Accelerated aging studies were done on a medium molecular weight chitosan film with glycerol cast from an acetic acid and water solution. The accelerated aging was done by placing 1×1 cm squares of the film in a 65° C. oven for 0, 2, 5, and 24 hours. Results from the accelerated aging studies can be seen in FIG. 24.

As the films were heated to simulate aging they slightly discolored, turning from almost colorless to a yellow color and curling around the edges. This was also characteristic of films that were not subjected to accelerated aging, i.e., films left on the bench for several months, indicating that the accelerated aging method was reliable as a pseudo-aging procedure. Extreme discoloring was seen above 65° C. The studies also showed a film that turned brown as it is heated up to temperatures as high as 100° C.

Figure 24:
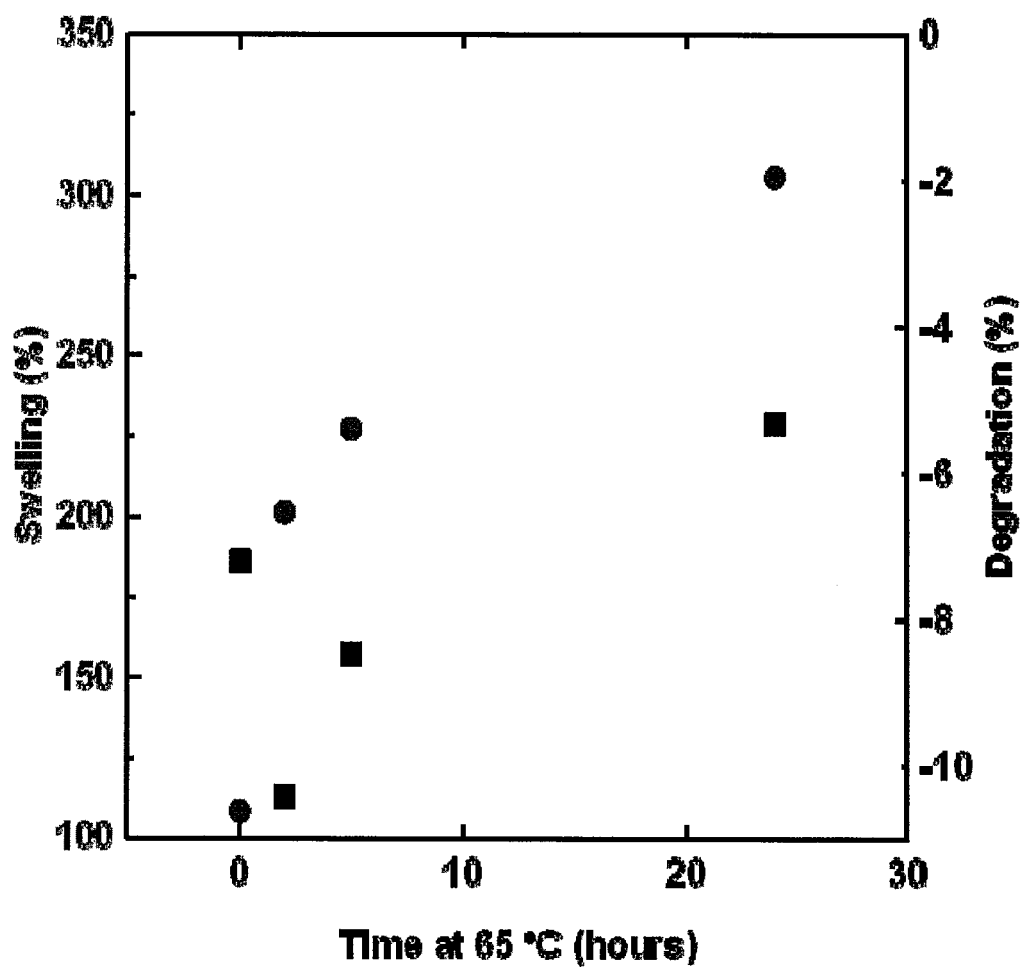
FIG. 24 shows a graph of the affect of accelerated aging on the films.

After the films were heated to accelerate the aging process, they were tested in SCF and then an HCl acidic solution for degradation and swelling characteristics. FIG. 24 shows the swelling and degradation of the films after being immersed in SCF for 24 hours.

The accelerated aging tests showed that the films that were treated at elevated temperatures for extended periods of time experienced increased swelling. This may be attributed to a breakdown of the polymer structure, which in the case of 24 hours at 65° C. leads to extreme 300% swelling. The degradation of the accelerated aging films does not appear to be altered with the aging process, as all films still degrade as much as others tested. It is noted that the relation between treating a film at 65° C. for 10 hours and normal film aging is not clear; however, tests in an HCl solution to simulate a predation event show that the longer the film was subjected to elevated temperatures, the faster it degraded. All of the films degraded within two hours, however the film treated for 24 hours at 65° C. degraded in an hour. Therefore, aging does not appear to adversely influence the use of these films for pH-dependent degradation.

Based on the studies that were performed, a possible formulation for a chitosan slurry with additives suitable for use as a pH sensitive material in a predation tag may be summarized as follows. A plasticizer such as glycerol can be added in concentrations from 3% to 20% mass relative to chitosan. At this concentration the film gains flexibility while avoiding extreme swelling that is characteristic of higher concentrations of plasticizer. Cross-linking may be done with sodium citrate, as it decreases swelling and degradation compared to other cross-linkers. The concentration of sodium citrate that increases the strength of the chitosan film while lowering degradation was between 5% and 30% by mass of cross-linking solution. The time for cross-linking had little effect on the properties of the film compared to the cross-linker concentrations, thus a half hour was sufficient.

The above formulation may be well suited for casting a film over exposed electrodes; however, it was too runny to adhere a magnet to a tag. The maximum concentration of chitosan in a slurry that could be stirred with a magnetic stir bar was 2 mass %. In order to increase the chitosan concentration, the slurry had to be mixed by hand. Concentrations as high as 10 mass % could be achieved when mixing by hand. Slurries with chitosan concentrations from 2 to 10 mass % were tested.

The stirred slurries had trapped air bubbles and were allowed to sit and degas overnight. The 8 and 10 mass % chitosan slurries were more like a paste. All except the 2 mass % chitosan slurry still had gas bubbles remaining after 24 hours of sitting. The 4 mass % chitosan took several days to degas, which may be too long for production. Above 4 mass % there were uniformity issues (clumpy), even though the chitosan did go into solution. The 2 mass % solution degassed quickly and was uniform but it was not viscous enough while 4 mass % was viscous enough and uniform but degassed too slowly. A slurry with 3 mass % chitosan proved acceptable for adhering a magnet to the tag. The 3 mass % slurry was viscous enough, uniform, and degassed overnight. This 3 mass % chitosan slurry was placed drop wise on the tags with a paperclip piece (approx. 5 mm in length). The paperclip piece was used to mimic the eventual small rare earth magnet and was situated in a small well on the tag as depicted in FIGS. 8A-8C. The 3 mass % chitosan slurry beaded overtop the paperclip piece and provided an effective adhesive. After the slurry was allowed to dry it formed a thin film protecting the paperclip contained in the well.

A 300 mL batch of the 3 mass % slurry may be made with 9 g of the medium molecular weight chitosan (3 mass %) suspended in 150 mL of distilled water. Once suspended, 150 mL of the 0.4 M acetic acid solution may added. This two-step process prevents clumping of the chitosan. The solution may then be stirred by hand with a stirring rod. Next, 0.9 g (27 drops) of glycerol (10 mass % to chitosan) may be added drop wise while stirring once again with a glass stir rod. The slurry may then be allowed to sit overnight so that any bubbles that may have formed can escape (degassing).

The amount of slurry to be applied to the tags may be determined experimentally. Application of the slurry was found to be easiest if done by dripping a single drop onto a tag and then adding each additional drop one at a time with a drying step in between. Eight tags with dried films were tested in SCF overnight and then degraded in an HCl solution. There were two tags each with 1, 2, 3, or 4 drops of slurry. Multiple drops were applied by letting the prior drop dry before adding another. One of each of the 1, 2, 3, and 4 drop tags was cross-linked using 7% NaOH/10% sodium citrate by allowing them to soak in the cross-linking solution for two hours. The cross-linking solution was made by dissolving 7 g NaOH pellets and 10 g sodium citrate in 100 mL distilled water. Once the two hours passed, the tags were removed and rinsed with copious amounts of distilled water until the diluent was neutral, as tested with pH paper. The tags were then placed in SCF overnight. Tags with more than two drops showed excessive swelling in the SCF.

After the tags sat in the SCF overnight, they were placed in weakly acidic HCl solution (pH~3) to test the time for degradation. The adhesive was determined to be degraded when the adhered paperclip piece fell from its well. The tags were checked every half hour by shaking the vial they were contained in. Table 2 shows the time it took for degradation of the adhesive according to the number of drops applied and whether it was cross-linked.

TABLE 2

Hours to degrade chitosan adhesive on different tags.

| Number of drops of slurry | Cross-link | Time to degrade (hours) |
|---|---|---|
| 1 | No | 2.5 |
| 1 | Yes | 3 |
| 2 | No | 5 |
| 2 | Yes | 6 |
| 3 | No | 7 |
| 3 | Yes | 8 |
| 4 | No | 11 |
| 4 | Yes | 12 |

The adhesive always degraded on the order of hours. As expected, the more drops of slurry on the tag, the longer degradation took. The results also show that the cross-linking step usually added an extra hour to the degradation time. It is desirable that the chitosan degrade relatively rapidly in the low pH of the fish gut. Digestion can take from a couple of hours to a day or so in fish. One or two drops of medium molecular weight chitosan slurry with a cross-linking step would be sufficient in order to keep the degradation time around six hours or less. It should be noted that in a fish gut the tags would be subjected to harsher treatment in terms of churning action and a lower pH.

Several small tags using rare earth magnets measuring approximately 1 mm×0.5 mm were tested. In the tag tested, a battery was in close proximity to where the magnet was adhered. As a result, the magnet was attracted to the metal components of the battery, making adhesion difficult. The magnet had to be held in place while the chitosan adhesive dried in order for the magnet to remain in the correct position and not jump to the battery. For this to occur, only a small drop of slurry was initially applied beneath the magnet while a plastic piece not touching the adhesive, such as tweezers, held the magnet. The chitosan adhesive dried to give an initial bond between the magnet and tag sufficient to prevent the magnet from jumping to the metal components of the battery. After drying was complete, the plastic piece could be removed and a second drop of chitosan adhesive could be applied to coat the rest of the magnet and provide protection and robustness to the magnet and tag once implanted. The second drop could be from the same slurry or a different one, meaning the concentration of chitosan in the two drops can be different, such as 2, 3 or 4 mass %, as it has relatively little effect on the properties of the final product.

Tags with the small rare earth magnets adhered as described were tested in SCF. The devices were tested for a period of seven days of immersion in SCF and the magnet remained in place during this time period, although some swelling of the adhesive was apparent to the naked eye. After being in the SCF, the tags were transferred to an HCl solution that simulated a predation event. The adhesive quickly degraded, within a half hour, and the magnet fell from its place, usually jumping to the battery close-by. This degradation was much quicker than the regular tags that were tested using a paperclip which may be attributed to the attractive force between the rare earth magnet and the magnetic components of the battery nearby. The paperclip, in contrast, would fall out of its place due to gravity.

Various predation tags have been described above that utilize a pH sensitive material in order to provide a measurable change when the tag is in an acidic environment. A chitosan slurry formulation has been described, which may be useful as the pH sensitive material. The slurry may be used in adhering rare earth magnets on fish tags as a way to detect predation events, or for coating electrodes or other sensors.

Although specific embodiments of predation tags have been described, along with various formulations for pH sensitive material that is suited for use with the predation tag, other embodiments may be provided that change a measurable characteristic when in the presence of an acidic environment. The change in the characteristic can be detected by the tag and used to adjust the operation of the tag in order to indicate that a predation event was detected. It will be appreciated by those skilled in the art that other forms, arrangements or configurations of tags, sensors and related materials may be employed to provide an indication as to whether an animal being tracked was eaten by a predator.

What is claimed is:

1. A tag for tracking an aquatic animal comprising:
a sensor for detecting a characteristic of the tag;
a pH sensitive material exposed to an external environment of the tag, the pH sensitive material degrading in the presence of an acidic environment, the degradation of the pH sensitive material causing a detectable change in a characteristic of the tag detected by the sensor; and
a transducer for transmitting an ultrasonic signal based on at least the detection of the characteristic of the tag by the sensor,
wherein the sensor for detecting the characteristic of the tag comprises a magnetic field sensor capable of sensing a presence or absence of a magnet, wherein the magnet is fastened to the tag by the pH sensitive material such that the magnet is released from the tag when the pH sensitive material degrades in the acidic environment and a change in the presence or absence of the magnet detected by the sensor when the magnet is released provides an indication of a predation event.

2. The tag of claim 1, wherein the acidic environment is a gut of a predator fish.

3. The tag of claim 1, wherein the pH sensitive material does not degrade in a neutral or basic environment due to the neutral or basic environment.

4. The tag of claim 3, wherein the neutral or basic environment is a coelomic cavity.

5. The tag of claim 1, wherein the pH sensitive material comprises a chitosan.

6. The tag of claim 5, wherein the pH sensitive material is cast from a slurry of the chitosan and a solvent.

7. The tag of claim 6, wherein the solvent is selected from:
L-ascorbic acid;
citric acid;
acetic acid; and
hydrochloric acid.

8. The tag of claim 6, wherein the solvent is citric acid.

9. The tag of claim 6, wherein the solvent is acetic acid.

10. The tag of claim 5, wherein the pH sensitive material comprises a film having a thickness of at least 0.05 mm.

11. The tag of claim 10, wherein the pH sensitive material comprises a film having a thickness of at least 0.20 mm.

12. The tag of claim 5, wherein the pH sensitive material comprises a plasticizing agent.

13. The tag of claim 12, wherein the plasticizing agent is selected from:
glycerol;
ethylene glycol;
poly ethylene glycol;
erythritol;
oleic acid;
propylene glycol;
di-hydroxyl stearic acid; and
sorbitol.

14. The tag of claim 12, wherein the plasticizing agent is glycerol.

15. The tag of claim 12, wherein the pH sensitive material was treated with a cross-linking agent.

16. The tag of claim 15, wherein the cross-linking agent is selected from:
sodium citrate;
sodium sulfate; and
calcium chloride.

17. The tag of claim 1, further comprising a microprocessor coupled to the transducer and the sensor, the microprocessor controlling the transmission of the ultrasonic signal by the transducer.

18. The tag of claim 17, wherein the microprocessor operates in at least one of a first mode or a second mode based on at least the detection of the characteristic of the tag by the sensor.

19. The tag of claim 18, wherein the microprocessor switches from operating in the first mode to operating in the second mode when the detection of the characteristic of the tag by the sensor changes as a result of a degradation of the pH sensitive material in the presence of the acidic environment.

20. The tag of claim 17, wherein the microprocessor operates in at least a configuration mode for transferring data to the tag to configure operation of the microprocessor.

21. The tag of claim 20, wherein a varying magnetic field is used for transferring data to the tag when the microprocessor is in the configuration mode.

22. The tag of claim 21, wherein the microprocessor further operates in at least a calibration mode for determining a value for a compensation magnetic field to allow detecting of the varying magnetic field used for transferring data in the presence of a constant magnetic field.

23. The tag of claim 22, wherein the microprocessor calculates the value for the compensation magnetic field and transmits the calculated value for the compensation magnetic field to an activation device.

24. The tag of claim 22, wherein the tag transmits an indication of detected magnetic field in order to allow an activation device to calculate the value for the compensation magnetic field.

25. A tag for tracking an aquatic animal comprising:
a sensor for detecting a characteristic of the tag;
a pH sensitive material exposed to an external environment of the tag, the pH sensitive material degrading in the presence of an acidic environment, the degradation of the pH sensitive material causing a detectable change in a characteristic of the tag detected by the sensor; and
a transducer for transmitting an ultrasonic signal based on at least the detection of the characteristic of the tag by the sensor,
wherein the sensor for detecting the characteristic of the tag comprises electrodes covered in the pH sensitive material, wherein an impedance of the electrodes changes as the pH sensitive material degrades in the acidic environment and wherein a predation event is determined to have occurred when a measured impedance of the electrodes crosses a predation threshold value as the pH sensitive material degrades.

26. The tag of claim 25, wherein the acidic environment is a gut of a predator fish.

27. The tag of claim 25, wherein the pH sensitive material does not degrade in a neutral or basic environment due to the neutral or basic environment.

28. The tag of claim 27, wherein the neutral or basic environment is a coelomic cavity.

29. The tag of claim 25, wherein the pH sensitive material comprises a chitosan.

30. The tag of claim 29, wherein the pH sensitive material is cast from a slurry of the chitosan and a solvent.

31. A tag for tracking an aquatic animal comprising:
a sensor for detecting a characteristic of the tag;
a pH sensitive material exposed to an external environment of the tag, the pH sensitive material degrading in the presence of an acidic environment, the degradation of the pH sensitive material causing a detectable change in a characteristic of the tag detected by the sensor; and
a transducer for transmitting an ultrasonic signal based on at least the detection of the characteristic of the tag by the sensor,
wherein the sensor for detecting the characteristic of the tag comprises a resilient electrode separated from a second electrode by the pH sensitive material, wherein the resilient electrode is biased in order to contact the second electrode when the pH sensitive material degrades in the acidic environment and wherein the resilient electrode is restrained from contacting the second electrode by the pH sensitive material when the pH sensitive material is not degraded.

32. The tag of claim 31, wherein the acidic environment is a gut of a predator fish.

33. The tag of claim 31, wherein the pH sensitive material does not degrade in a neutral or basic environment due to the neutral or basic environment.

34. The tag of claim 33, wherein the neutral or basic environment is a coelomic cavity.

35. The tag of claim 31, wherein the pH sensitive material comprises a chitosan.

36. The tag of claim 35, wherein the pH sensitive material is cast from a slurry of the chitosan and a solvent.

37. A tag for tracking an aquatic animal comprising:
a sensor for detecting a characteristic of the tag;
a pH sensitive material exposed to an external environment of the tag, the pH sensitive material degrading in the presence of an acidic environment, the degradation of the pH sensitive material causing a detectable change in a characteristic of the tag detected by the sensor; and
a transducer for transmitting an ultrasonic signal based on at least the detection of the characteristic of the tag by the sensor,
wherein the sensor for detecting the characteristic of the tag comprises a resilient strain gauge cast within the pH sensitive material such that when the pH sensitive material degrades in the acidic environment the resilient strain gauge changes configurations.

38. The tag of claim 37, wherein the acidic environment is a gut of a predator fish.

39. The tag of claim 37, wherein the pH sensitive material does not degrade in a neutral or basic environment due to the neutral or basic environment.

40. The tag of claim 39, wherein the neutral or basic environment is a coelomic cavity.

41. The tag of claim 37, wherein the pH sensitive material comprises a chitosan.

42. The tag of claim 41, wherein the pH sensitive material is cast from a slurry of the chitosan and a solvent.

43. A tag for tracking an aquatic animal comprising:
a sensor for detecting a characteristic of the tag;
a pH sensitive material exposed to an external environment of the tag, the pH sensitive material degrading in the presence of an acidic environment, the degradation of the pH sensitive material causing a detectable change in a characteristic of the tag detected by the sensor; and
a transducer for transmitting an ultrasonic signal based on at least the detection of the characteristic of the tag by the sensor,
wherein the sensor for detecting the characteristic of the tag comprises a light transmitting device and a light receiving device aligned with the light transmitting device and separated by the pH sensitive material to block transmission of light from the light transmitting device to the light receiving device.

44. The tag of claim 43, wherein the acidic environment is a gut of a predator fish.

45. The tag of claim 43, wherein the pH sensitive material does not degrade in a neutral or basic environment due to the neutral or basic environment.

46. The tag of claim 45, wherein the neutral or basic environment is a coelomic cavity.

47. The tag of claim 43, wherein the pH sensitive material comprises a chitosan.

48. The tag of claim 47, wherein the pH sensitive material is cast from a slurry of the chitosan and a solvent.

* * * * *